United States Patent
Touag et al.

(10) Patent No.: US 9,294,929 B2
(45) Date of Patent: Mar. 22, 2016

(54) LTE OPERATION IN SMALL CELLS USING DYNAMIC SHARED SPECTRUM

(71) Applicant: InterDigital Patent Holdings, Inc., Wilmington, DE (US)

(72) Inventors: Athmane Touag, Chomedey Laval (CA); Jean-Louis Gauvreau, La Prairie (CA); Rocco Di Girolamo, Laval (CA); Martino M. Freda, Laval (CA); Joseph M. Murray, Schwenksville, PA (US); Mihaela C. Beluri, Jericho, NY (US); Scott Laughlin, Montreal (CA); Debashish Purkayastha, Collegeville, PA (US); Angelo A. Cuffaro, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/380,639

(22) PCT Filed: Feb. 22, 2013

(86) PCT No.: PCT/US2013/027514
§ 371 (c)(1),
(2) Date: Aug. 22, 2014

(87) PCT Pub. No.: WO2013/126843
PCT Pub. Date: Aug. 29, 2013

(65) Prior Publication Data
US 2015/0018002 A1   Jan. 15, 2015

Related U.S. Application Data

(60) Provisional application No. 61/602,997, filed on Feb. 24, 2012, provisional application No. 61/749,141, filed on Jan. 4, 2013.

(51) Int. Cl.
*H04W 16/14* (2009.01)
*H04W 16/32* (2009.01)
*H04W 72/04* (2009.01)
*H04W 84/04* (2009.01)
*H04W 92/20* (2009.01)

(52) U.S. Cl.
CPC ............ *H04W 16/14* (2013.01); *H04W 16/32* (2013.01); *H04W 72/048* (2013.01); *H04W 72/0426* (2013.01); *H04W 84/045* (2013.01); *H04W 92/20* (2013.01)

(58) Field of Classification Search
CPC .......................... H04W 16/14; H04W 72/048
USPC ....................................................... 455/454
See application file for complete search history.

(56) References Cited

U.S. PATENT DOCUMENTS

| | | |
|---|---|---|
| 2011/0249642 A1 | 10/2011 | Song et al. |
| 2012/0039284 A1 | 2/2012 | Barbieri et al. |
| 2012/0178467 A1* | 7/2012 | Fujii et al. ................. 455/452.1 |
| 2013/0258979 A1* | 10/2013 | Hulkkonen et al. .......... 370/329 |
| 2014/0362691 A1* | 12/2014 | Lei et al. ...................... 370/230 |

FOREIGN PATENT DOCUMENTS

WO   WO 2010/111150 A2   9/2010

OTHER PUBLICATIONS

European Telecommunications Standards Institute (ETSI), TR 102 907. V0.0.9, "Reconfigurable Radio Systems (RRS), Use Cases for Operation in White Space Frequency Bands", Jan. 2011, pp. 1-54.

* cited by examiner

*Primary Examiner* — Leon Flores
(74) *Attorney, Agent, or Firm* — Condo Roccia Koptiw LLP

(57) ABSTRACT

Systems, methods, and apparatus may be used to provide assistance for connection procedures in a hierarchical network where macro cells may be operating in licensed spectrum while small cells may be operating in dynamic and shared spectrums, such as TVWS. This may be done, for example, to allow an LTE system performing carrier aggregation (CA) to reconfigure itself to change from a supplementary cell (SuppCell) in one dynamic and shared spectrum channel to a SuppCell in another dynamic and shared spectrum channel.

21 Claims, 17 Drawing Sheets

LTE OPERATION IN SMALL CELLS USING DYNAMIC SHARED SPECTRUM

CROSS REFERENCE TO RELATED APPLICATION

This application is the National Stage entry under 35 U.S.C. 371 of PCT Application No. PCT/US2013/027514, filed Feb. 22, 2013, which claims the benefit of U.S. Provisional Patent Application No. 61/602,997, filed Feb. 24, 2012; and U.S. Provisional Patent Application No. 61/749,141, filed on Jan. 4, 2013; the contents of which are hereby incorporated by reference herein.

BACKGROUND

Because of the transition from analog to digital TV transmissions in the 470-862 MHz frequency band, certain portions of the spectrum are no longer used for TV transmissions, though the amount and exact frequency of unused spectrum varies from location to location. These unused portions of spectrum are referred to as TV White Space (TVWS). The FCC has opened up these TVWS frequencies for a variety of unlicensed uses. For example, the White Space in the 470-790 MHz bands may be used by secondary users for any radio communication that may not interfere with other incumbent/primary users. Thus, the use of LTE and other cellular technologies within the TVWS bands has recently been considered.

New entrants would not have access to licensed spectrum and would have to deploy LTE in shared spectrum such as TVWS or the industrial, scientific, and medical band (ISM). TVWS is broad and composed of a large numbers of channels often occupied by other technologies which make network discovery challenging. Since channels are shared with other operators and other radio access technologies (RATS), these channels are often polluted with localized interferers. The availability of the channels often changes over a short period, therefore the LTE system often has to be reconfigured. Additionally, small cells deployed in in this spectrum may not be able to anchor the LTE system to a licensed spectrum, thus mobility management may be a challenge and the LTE system may support both uplink and downlink in the spectrum.

SUMMARY

Disclosed herein are systems, methods, and apparatus to provide connection procedures in a hierarchical network where macro cells may be operating in a licensed spectrum while small cells may be operating in dynamic and/or shared spectrums. This may be done, for example, to allow an LTE system performing carrier aggregation (CA) to reconfigure itself to change from a supplementary cell (SuppCell) in one unlicensed channel to a SuppCell in another unlicensed channel. To use the unlicensed band in an LTE system, spectrum may be used to create component carriers that may be used for carrier aggregation. These component carriers may be referred to as supplementary component carriers (SuppCCs) and the cells that may be created by these carriers may be referred to as supplementary cells (SuppCells). The properties of an unlicensed band may cause an LTE system to dynamically change the SuppCell from one unlicensed frequency channel to another.

Assistance information may be transmitted, for example, over system information blocks (SIBs). The assistance information may also be sent over dedicated links that may be part of a radio resource control (RRC) procedure. The assistance information may include of information that may relate to small cells in range of a macro cell. Assisted random access channel (RACH) procedures may be used to assist a wireless transmit/receive unit (WTRU) camping on a macro cell to connect to a small cell by enabling the WTRU to initiate a RACH procedure on the small cell operating in dynamic and shared spectrum. Paging procedures may also be used such that a page may be received on a macro cell, but the connection request may be handled on a small cell operating in a dynamic and shared spectrum. Additionally, localized interference may be handled by configuring cells for UEs to operate in UL, DL, or in both directions.

Frequency allocation and operating mode of small cells operating in a shared spectrum may be provided and may be performed through a Shared Spectrum Manager (SSM). This information may be pushed to the macro cell through an X2 interface. This information may include TDD configuration, coexistence gaps, multi-layer/single layer capability, geo-location, range, or the like.

A method may be provided for connecting to a small cell in network where a macro cell may be operating in a licensed spectrum. A connection to a macro cell operating in the licensed spectrum may be made using an idle mode. Small cell information may be received from the macro cell. The small cell information may provide a list of one or more small cells near the location of the WTRU and may provide an operating frequency for the one or more small cells. A connection may be made to a small cell from the list of one or more small cells using a connected mode.

A method may be provided for connecting to a small cell in a dynamic and shared spectrum. A connection may be made to a first small cell operating in the dynamic and shared spectrum using an idle mode. Neighboring small cell information may be received from the first small cell. The neighboring small cell information may include a list of one or more small cells near the location of the WTRU and an operating frequency for the one or more small cells.

A method for paging a user equipment (UE) in a network where a macro cell may be operating in a licensed spectrum. One or more small cells may be ranked to generate a ranked list of small cells. A page may be received from a macro cell. The page may instruct the WTRU to connect to a small cell. The ranked list of small cells may be used to select a small cell. A connection may be established to the selected small cell.

A method may be provided to discover a small cell. A small cell proximity signal may be detected. A proximity signal identification may be send to a macro cell. Small cell operating mode information may be received from the macro cell.

A method may be provided to send small cell operating information. A small cell list request may be sent. A small cell list response may be received. The small cell list response may include operating information for one or more small cells. The operating information for the one or more small cells may be send to a UE.

An enhanced home node B (HeNB) may be provided. The HeNB may include a processor that may be configured to perform a number of actions. For example, the HeNB may use the processor to determine a cell operating mode for a small cell operating in a dynamic and shared spectrum that may indicate whether the small cell may be operating in a multi-layer mode or a single-layer mode. The HeNB may generate a small cell information response that may include the cell operating mode. The HeNB may send the small cell information response to a macro base station via, for example, an X2 interface to enable the macro base station to determine a layer connectivity mode for a wireless transmit/receive unit (WTRU). The HeNB may receive a small cell information request from the macro base station. The HeNB may determine an identification of a cluster of cells that may include the small cell, may determine a load level for the small cell that may indicate an amount of data traffic at the small cell, and/or may determine a multi-layer/single layer capability of the small cell. The HeNB may determine a location for the small cell, may determine a location of an edge of the small cell, may determine a frequency allocation for the small cell, and/or may determine a coexistence mode that may indicate an operating mode that may be compatible with another HeNB. The HeNB may determine a neighbor small cell, receive neighbor small cell information from the neighbor small cell, and/or send the neighbor small cell information to the WTRU.

The HeNB may send small cell information to a macro base station, which may include an identification of a cluster of cells that may include the small cell, a load level for the small cell that may indicate an amount of data traffic at the small cell, and/or may determine a multi-layer/single layer capability of the small cell. The small cell information may include a location for the small cell, a location of an edge of the small cell, a frequency allocation for the small cell, and/or may a coexistence mode. The small cell information may include a neighbor small cell and/or neighbor small cell information.

An HeNB may be provided. The HeNB may include a processor that may be configured to perform a number of actions. For example, the processor of the HeNB may be configured to receive a small cell information response from a small cell operating in a dynamic and shared spectrum that may indicate a layer connectivity mode of the small cell. The HeNB may determine a layer connectivity mode for a wireless transmit/receive unit (WTRU) using the small cell information response. The layer connectivity mode for the WTRU may be one of a single layer with a macro cell mode, a single layer with the small cell mode, or a multi-layer mode. The HeNB may send the layer connectivity mode to the WTRU to enable the WTRU to operate in a single layer mode with a macro base station, operate in a single layer mode with a small HeNB, and/or operate in a multi-layer mode. The HeNB may send a small information request to a small HeNB, and/or may determine a multi-layer/single layer capability of the small cell.

A HeNB may be provided. The HeNB may include a processor that may be configured to perform a number of actions. For example, the HeNB may use the processor to determine a discovery frame to be used for sending a proximity signal. The HeNB may determine a subframe of the discovery frame and a symbol of the subframe that may be used to identify a small cell. The HeNB may generate the proximity signal for the small cell using the subframe and the symbol. The HeNB may send the proximity signal in the discovery frame to a wireless transmit/receive unit (WTRU) that may enable the WTRU to identify and locate the small cell. The HeNB may send the discovery frame, the subframe, and the symbol to a macro base station to enable the macro base station to identify the proximity signal as belonging to the small cell. The HeNB determine the discovery frame by determining the discovery frame that may be used for an operator or a public land mobile network.

A WTRU may be provided. The WTRU may include a processor that may be configured to perform a number of actions. For example, the processor may determine a discovery frame to be used for receiving a proximity signal for the WTRU. The WTRU may receive the proximity signal using the discovery frame from a small cell. The WTRU may determine a subframe of the discovery frame and a symbol of the subframe from the proximity signal. The WTRU may send the subframe and the symbol of the subframe to a macro enhanced home node-B (HeNB). The WTRU may determine an identity of the small cell that sent the proximity signal using the subframe and the symbol, may determine a signal strength of the proximity signal, and/or may determine a location of the small cell using the signal strength of the proximity signal. The WTRU may send the signal strength of the proximity signal to the macro base station. The WTRU may receive an identity and a location of the small cell from the macro base station, receive operating mode information for the small cell, receive a layer connectivity mode. The layer connectivity mode may be one of a single layer with a macro cell mode, a single layer with the small cell mode, or a multi-layer mode.

As used herein, an X2 interface may be used as an interface between two cells. For example, an X2 interface may be used between a macro cell and another macro cell, a macro cell and a small cell, a small cell and another small cell, or the like. The small cell and/or the macro cell may be managed by an eNB.

UE and network procedures may be provided for small cell discovery and selection of a small cell. This may be done, for example, for multi-layer or single layer operation and may be accomplished with assistance from a macro cell.

Procedure and selection algorithms may be provided. These procedures may, for example, enable a base station in a macro cell to determine whether a WTRU that may be served may stay in single layer with the macro base station, may be moved to a small cell in close proximity in single layer operation, or may be moved in a multi-layer operation.

Radio link control (RLC) routing functionality may be provided in a small cell. This may be done, for example, to keep track of which radio bearers may be tied to a macro cell (those in multi-layer) and which may be tied to the serving gateway (S-GW). This information may be used to route traffic in concurrent single layer and multi-layer operations.

A method may be provided where one or more small cells may be pushing its updated operating information to a neighbor small cell. This may be referred to as a push approach.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

In LTE-Advanced, two or more component carriers (CCs) may be aggregated in order to support wider transmission bandwidths, such as bandwidth up to 100 MHz. Carrier aggregation (CA) may increase the data rate achieved by an LTE system by allowing a scalable expansion of the bandwidth delivered to a user by enabling the simultaneous use of radio resources in multiple carriers.

A WTRU may be able to simultaneously receive or transmit on one or more CCs. The WTRU may also be capable of aggregating a different number of differently sized CCs in the uplink (UL) or the downlink (DL). Carrier aggregation (CA) may be supported for both contiguous and non-contiguous CCs.

Figure 1:
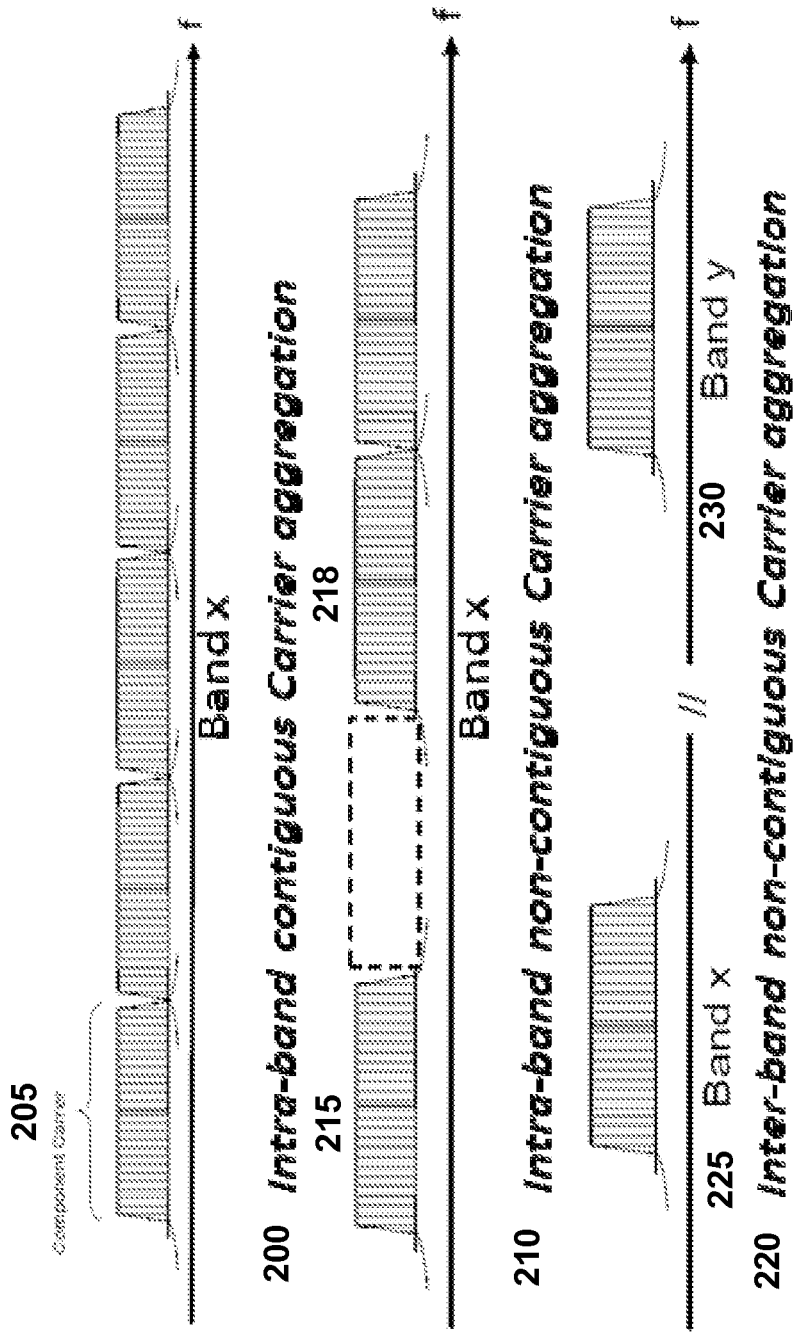
FIG. 1 illustrates a diagram of carrier aggregation types.

FIG. 1 illustrates a diagram of carrier aggregation types. As shown at 200, carrier aggregation may occur using Intra-band contiguous CA where multiple adjacent CCs, such as the component carrier at 205, may be aggregated to produce a contiguous bandwidth that may be wider than 20 MHz. As shown at 210, carrier aggregation may occur using Intra-band non-contiguous CA where multiple CCs, such as component carrier 215 and component carrier 218, that may belong to the same bands (but may not be adjacent), may be aggregated and may be used in a non-contiguous manner. As shown at 220, carrier aggregation may occur using Inter-band non-contiguous CA where multiple CCs may belong to different bands, such as band x at 225 and band y at 230, and may be aggregated.

Because of the transition from analog to digital TV transmissions in the 470-862 MHz frequency band, portions of the spectrum may not be used for TV transmissions. The amount and frequency of unused spectrum may vary from location to location. These unused portions of spectrum may be referred to as TV White Space (TVWS). The FCC has opened up these TVWS frequencies for a variety of unlicensed uses. For example, the White Space in the 470-790 MHz bands may be used by secondary users for any radio communication that does not interfere with other incumbent/primary users. Thus, the use of LTE and other cellular technologies within the TVWS bands may be considered.

To use the unlicensed band in an LTE system, spectrum may be used to create component carriers that may be used for carrier aggregation. These component carriers may be referred to as supplementary component carriers (SuppCCs) and the cells that may be created by these carriers may be referred to as supplementary cells (SuppCells). The properties of an unlicensed band may cause an LTE system to dynamically change the SuppCell from one unlicensed frequency channel to another. This may occur due to the presence of interference and potential primary users in the unlicensed bands. For example, interference (such as a microwave or cordless phone) may make a particular channel in the industrial, science, and medical (ISM) band unusable for data transmission. In addition, when dealing with TVWS channels as the unlicensed channels, a user of these channels may evacuate the channel upon the arrival of a system which may have exclusive rights to use that channel (TV broadcast or wireless microphone in the case of the TVWS). The nature of unlicensed bands and the increase in the number of wireless systems that may make use of these bands may cause the quality of channels within the licensed band to change dynamically. In order to adjust to this, an LTE system performing CA may be able to dynamically change from a SuppCell in an unlicensed channel to another to reconfigure itself to operate on a different frequency.

Cellular technologies may be modified to be deployed using small cells with shared and dynamic spectrum such as TVWS. This may allow new entrants such as Google, Microsoft, Apple, or Amazon to deploy their own network. The deployment of such of a network, even in a non-ubiquitous fashion, may allow new entrants to showcase or introduce these services to end customers, as these services may have been previously blocked by operators. Shared and dynamic spectrums may also allow the new entrants to offer a monthly billing relationship with end customer, which may allow the new entrants to develop business models using connectivity, provided the small cell network. The new entrants may also use the shared and dynamic spectrums for use with devices that may not have cellular connectivity. This may be done, for example, to address market segments that may not want to pay a monthly fee (tablets, Ipod Touch, Kindle).

Traditional operators may also benefit from deploying LTE in the dynamic and shared spectrum. For example, operators may mitigate and avoid small cell to macro cell interference. The operators may also offer a tiered service that may use small cells to service low mobility applications, such as machine to machine (M2M). Additionally, the dynamic and shared spectrum may offer operators capacity enhancements Systems, methods, and apparatus may be used to provide assistance for connection procedures in a hierarchical network where macro cells may be operating in licensed spectrum while small cells may be operating in dynamic and/or shared spectrums. To provide assistance for connection procedures, assistance information may be provided. The assistance information may include information relating to small cells in range of a macro cell. The assistance information may be transmitted over SIBs, or a dedicated link as part of an RRC procedure. The connection procedures may enable a WTRU camping on a macro cell to initiates a RACH procedure on a small operating in dynamic and shared spectrum. The connection procedures may provide assisted paging procedures where a page may be received on a macro cell but the connection request through assistance may be handled on a small cell operating in dynamic and shared spectrum. The connection procedures may also provide methods whereby localized interference may be handled through configuring cells for UEs to operate in UL, in DL, or in both directions.

Figure 2:
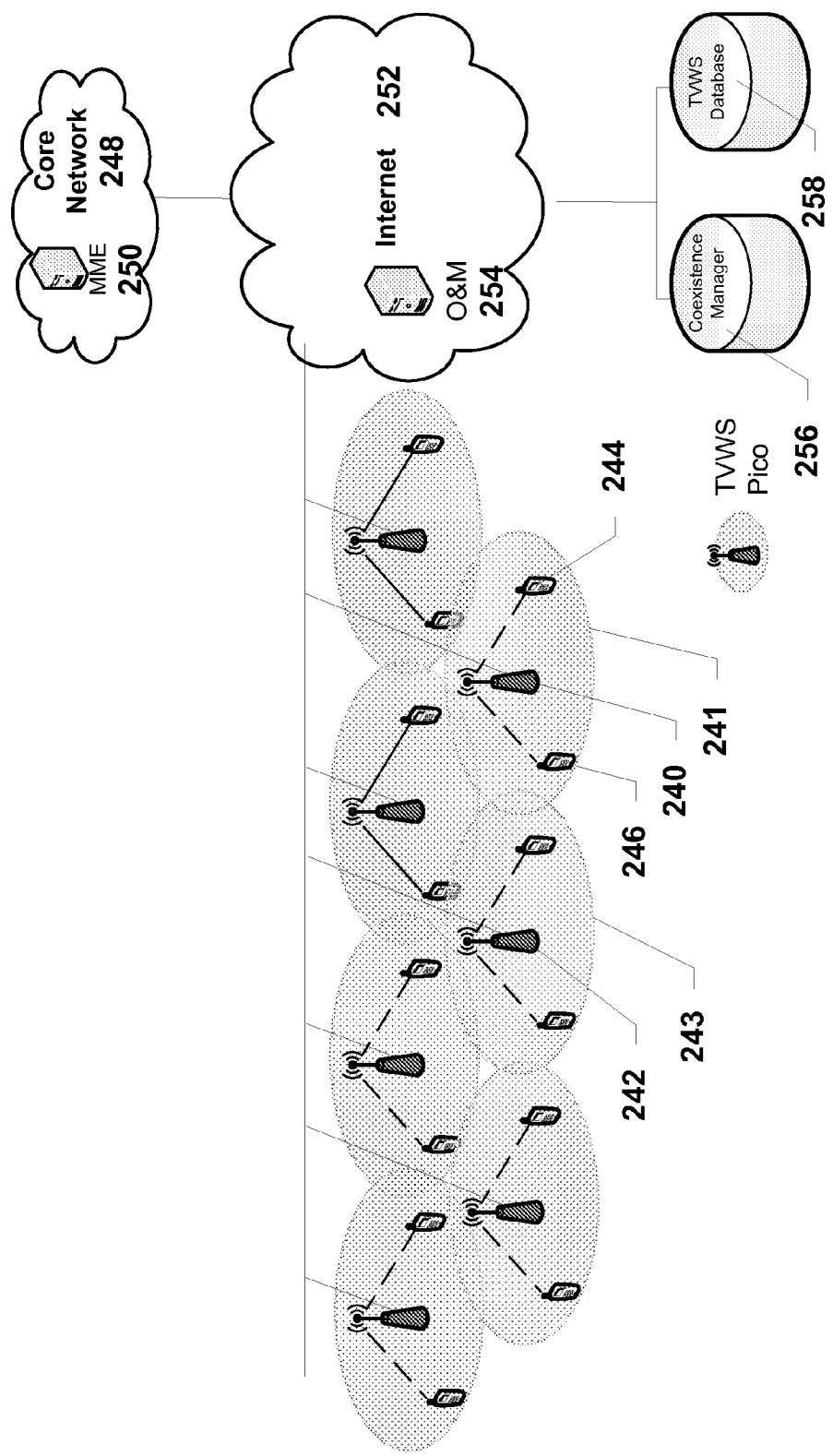
FIG. 2 illustrates small cells operating in a dynamic and shared spectrum.

FIG. 2 illustrates small cells operating in a dynamic and shared spectrum. This approach may be used by new entrants that may not have access to licensed spectrum. As shown in FIG. 2, a network, such as an LTE network, may be composed of one or more small cells, such as small cell 241 and small cell 243, operating in a dynamic and shared spectrum. A small cell may be a pico cell. A small cell may include a base station, such as base station 242 and base station 240. For example small cell 241 may include base station 240. A base station for a small cell may be connected to one or more UEs. For example, base station 240 may be connected to WTRU 246 and/or WTRU 244. Base stations operating in dynamic and shared spectrum, such as base station 242 and base station 240, may be limited in terms of transmitted output power and may have a small footprint. A base station may be linked to a TVWS database via, for example, an O&M entity. A base station may also be linked to a coexistence manager.

The small cells may be connected via base station to internet 252 and/or operation and maintenance (O&M) 254. Core network 248, which may include MME 250, may be connected to internet 252. Coexistence manager 256 and/or TVWS database 258 may be connected to internet 252. The base station of a small cell may communicate with core network 248, MME 250, internet 252, O&M 254, coexistence manager 256, and/or TVWS database 258.

Figure 3:
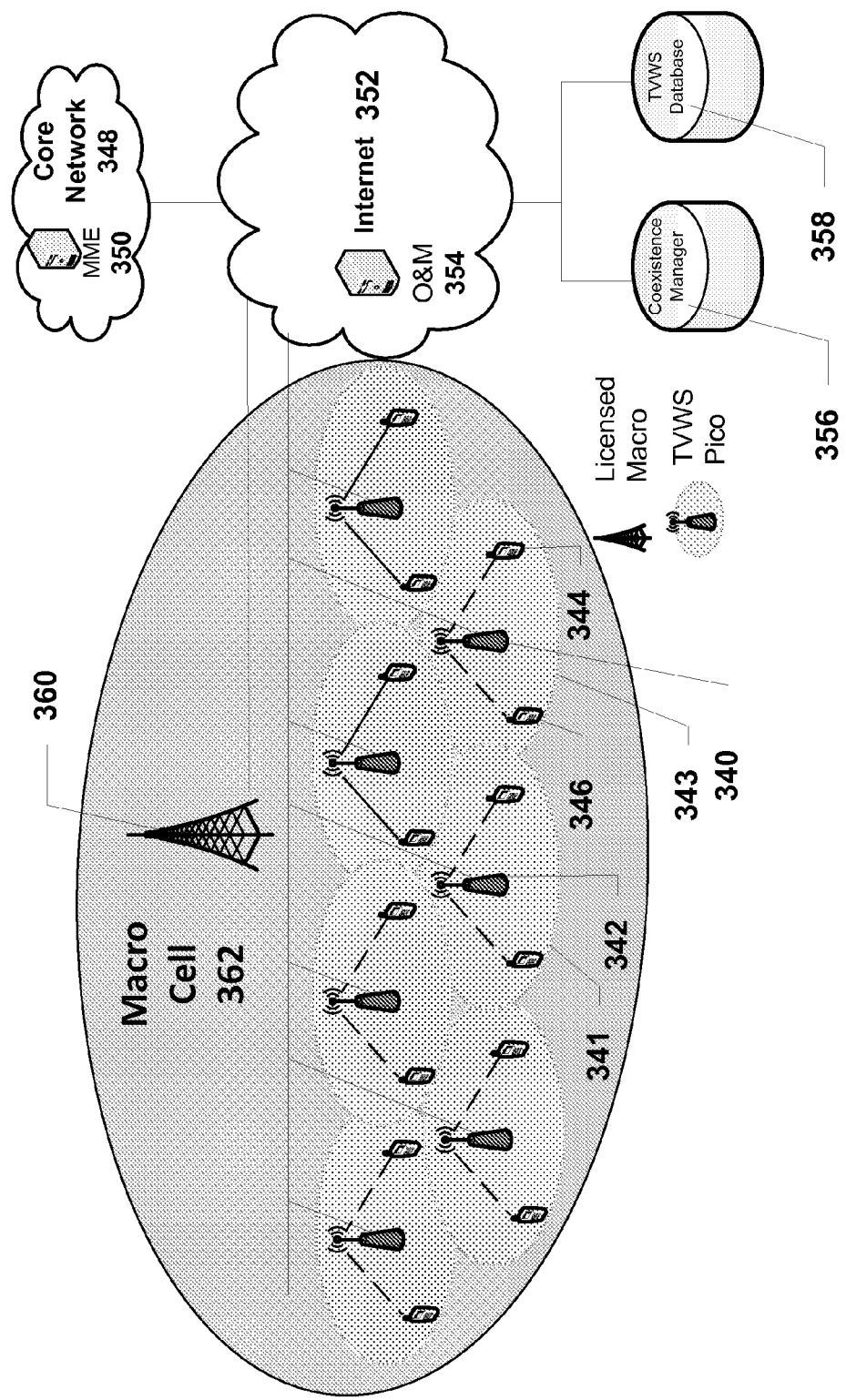
FIG. 3 illustrates small cells operating in a dynamic and shared spectrum with a licensed macro overlay.

FIG. 3 illustrates small cells operating in dynamic and shared spectrum with a licensed macro overlay. This approach may be used, for example, by an existing operator to add capacity to their network, to offer tiered services, or to offload capacity to the small cells. Base stations of both networks, the overlay macro cell and the small cells operating in the dynamic and shared spectrum, may access a TVWS database.

As shown in FIG. 3, the LTE network may be deployed using small cells operating in a dynamic and shared spectrum, but there may be an overlay of macro cells using a licensed spectrum. For example, small cells, such as small cell 341 and small cell 343, may be operating in a dynamic and shared spectrum while a macro cell, such as macro cell 362, may be using a licensed spectrum and may overlay the small cells.

As shown in FIG. 3, a network, such as an LTE network, may be composed of one or more small cells, such as small cell 341 and small cell 343, operating in a dynamic and shared spectrum. A small cell may be a pico cell. A small cell may include a base station, such as base station 342 and base station 340. For example, small cell 341 may include base station 340. A base station for a small cell may be connected to one or more UEs. For example, base station 340 may be connected to WTRU 346 and/or WTRU 344. Base stations operating in dynamic and shared spectrum, such as base station 342 and base station 340, may have a small footprint. A base station may be linked to a TVWS database via, for example, an O&M entity. A base station may also be linked to a coexistence manager.

The small cells may be connected via base station to internet 352 and/or O&M 354. Core network 348, which may include MME 350, may be connected to internet 352. Coexistence manager 356 and/or TVWS database 358 may be connected to internet 352. The base station of a small cell may communicate with core network 348, MME 350, internet 352, O&M 354, coexistence manager 356, and/or TVWS database 358.

Figure 4:
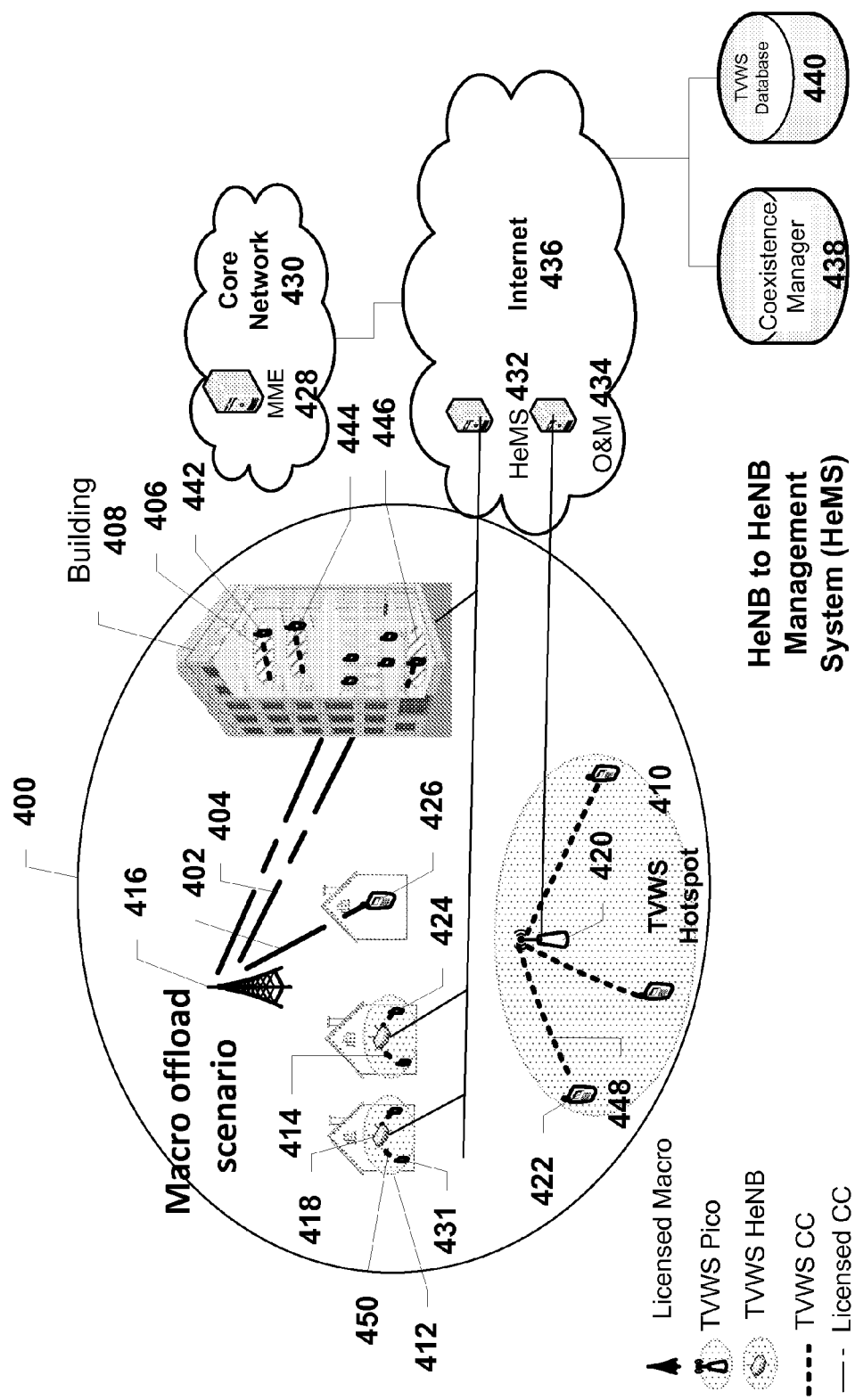
FIG. 4 illustrates non-contiguous small cells operating in a dynamic and shared spectrum with a licensed macro overlay.

FIG. 4 illustrates non-contiguous small cells operating in a dynamic and shared spectrum with a licensed macro overlay. For example, as shown in FIG. 4, an LTE network may be deployed using small cells operating in a dynamic and shared spectrum, but there may be an overlay of macro cells using a licensed spectrum. The small cells may be sparsely, or non-contiguously, deployed.

As shown in FIG. 4, a macro cell may be deployed at 400 and small cells may be deployed at 406, 410, 412, 414, 444, and/or 446. This may be done, for example, to offload data and/or traffic from a macro cell to one or more small cells. A small cell may include a base station such as a HeNB, a femtocell, a picocell, or the like. For example, small cell 412 may include base station 418, and small cell 410 may include base station 420. Macro cell 400 may include base station 416.

Small cell 412, small cell 414, small cell 406, small cell 444, and/or small cell 446 may be connected to internet 436 and/or HeNB to HeNB management system (HeMS) 432. Small cell 410, which may be a TVWS hotspot, may be connected to internet 436 and/or O&M 434. Internet 436 may include HeMS 432 and/or O&M 434. Internet 436 may be connected to coexistence manager 438, TVWS database 440, and/or core network 430. Core network 430 may include MME 428. Small cells may be 406, 410, 412, 414, 444, and/or 446 may be in communication with MME 428, core network 430, internet 436, HeMS 432, O&M 434, coexistence manager 438, and/or TVWS database 440.

Small cells 406, 444, and 446, may belong to building 408, which may be partially TVWS HeNB enabled. For example, a TVWS HeNB may be used within building 408 to provide network coverage, such as LTE network coverage, using small cells 406, 444, and/or 446. Macro cell 400 may communicate with one or more UEs within building 408 via, for example, base station 416 using license CC 404.

UE 422 may be connected to base station 420 via TVWS CC 448. WTRU 431 may be connected to base station 418 via TVWS CC 450. WTRU 426 may be connected to base station 416 via licensed CC 402.

A network, such as an LTE network, may be deployed using small cells, such as small cells 406, 410, 412, and/or 424, that may be operating in a dynamic and shared spectrum. These small cells may not have access to a licensed spectrum. A WTRU, such as WTRU 422, WTRU 424, WTRU 426, or WTRU 442, may be operating in connected mode with an eNB controlling the small cell. The WTRU may get its system information, control information (both uplink and downlink), and data information from the links operating in the shared spectrum. Fixed frequency duplex separation in dynamic spectrum may not be likely. A WTRU may support both uplink and downlink operation for control and data transmission by using a LTE TDD frame structure or LTE FDD in half duplex operation. The WTRU may be able to support carrier aggregation over multiple channels within the dynamic and shared spectrum. A WTRU may be able to support multiple UL/DL configurations within the same WTRU, but on different channels on the same band.

UEs and base stations, such as WTRU 422, WTRU 424, WTRU 426, WTRU 442, base station 420, and/or base station 418, may be operating in a dynamic and shared spectrum, such as TVWS, and may be able to operate as a sensing device. A sensing device may be a device that may, prior to transmitting on a given channel, may analyze a channel to detect if a primary user may be using the channel. UEs and base stations may also be able to operate as a mode I or as a mode II device per FCC rules.

Interfacing to a shared spectrum manager may be provided. Frequency allocation to individual small cells operating on a shared spectrum may be done, for example, through a shared spectrum manager (SSM). An SSM may be a spectrum broker that may be responsible for assigning spectrum or for informing spectrum availability to a requesting access user for a tier. This may be done, for example, in such a way that primary systems may be protected, and the requested Quality of Access (QoA) of tier users may be maintained. A QoA may refer to the amount of exclusive access for a given spectrum; exclusivity may be provided in time, space, spectrum segments, codes, or the like. The SSM may manage the bidding and billing process that may be associated with spectrum usage. A LTE small cell operating in DSS may operate as a tier 2 user, as a tier 3 user, over a channel mix from both tiers, or the like.

The underlying allocation and operation mechanism associated for tier 2 users may be different from that for tier 3 users. Tier 2 users may register with the SSM and may get a temporary license for spectrum use in exchange for a fee. A small cell may interact with the SSM to request frequency allocation, which may be assigned as a tier 2 user. Interaction with the SSM may involve a bidding process that may result, if the bidding process may have been successful, in the SSM assigning a temporary license to the small cell. This may provide some guaranteed QoA to the small cell. The relationship between the small cell operating as a tier 2 user and the SSM may be more controlled than with a tier 3 user, and may be referred to as a management based service.

Tier 3 users may register with the SSM and may get information about spectrum that may be available for tier 3 users. The SSM may provide additional information such as usage of other tier 3 users in proximity. A tier 3 user may provide information about its usage as a tier user.

Assistance for connection procedures in hierarchical cell structures may be provided. For example, assistance for connection procedures in a hierarchical network may be provided where macro cells may be operating in licensed spectrum, and small cells may be operating in dynamic and shared spectrum, but may not be limited to shared spectrum. Small cells may operate in single layer operation or multi-layer operation. Multi-layer operation may be a mode where a WTRU may be connected to two sites; a first site on a macro cell layer, and a second site on a small cell layer. In single-layer operation, when the WTRU may be handed-over to the small cell, the small cell base station may be responsible for the connected mode operation, which may include mobility from small cell to small cell.

Figure 5:
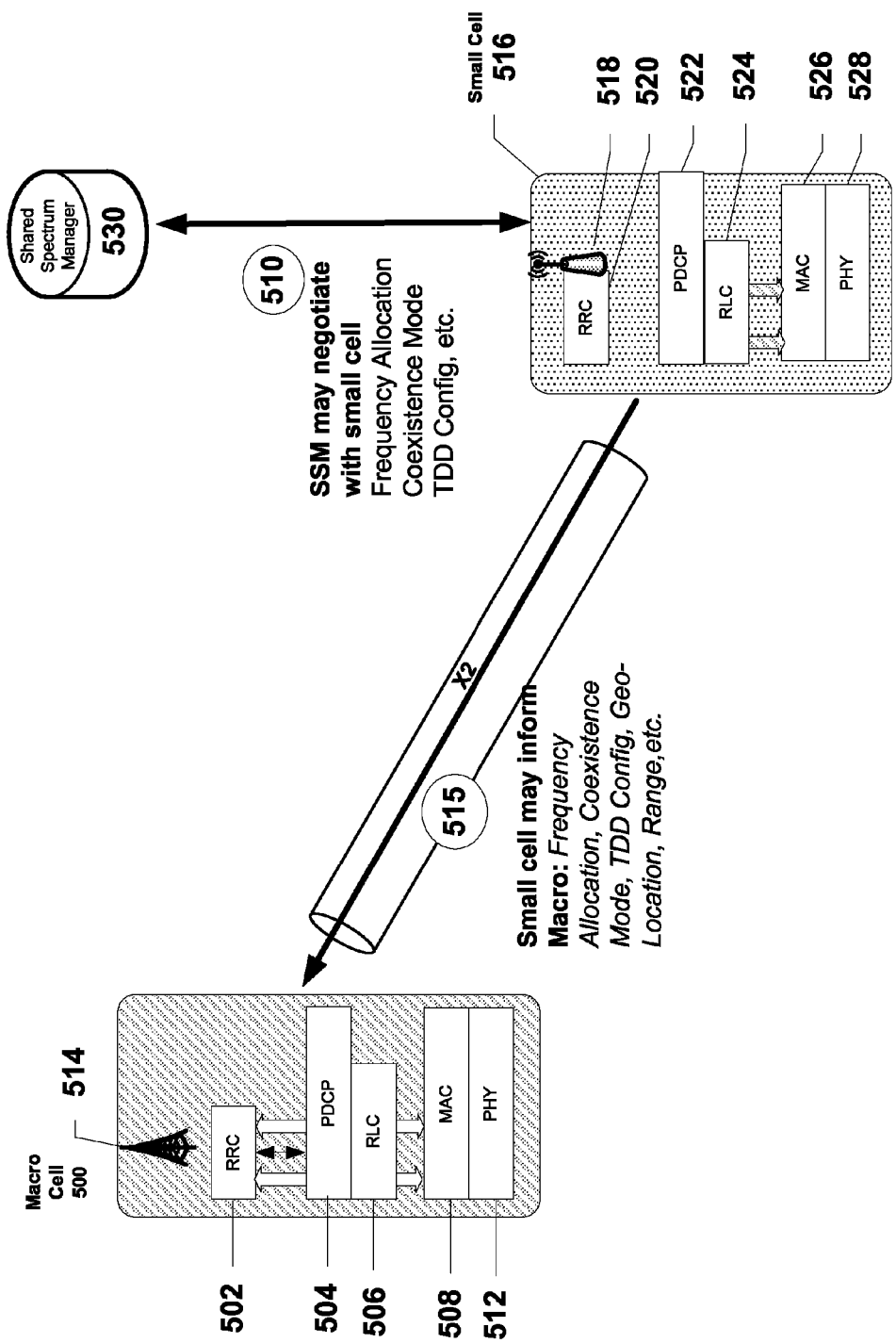
FIG. 5 illustrates an X2 interface that may be used for discovery.

An X2 interface for hierarchical discovery and WTRU connectivity setup (push) may be provided. FIG. 5 illustrates an X2 interface, such as the X2 interface at 515, that may be used for discovery. As shown in FIG. 5, an X2 interface at 515 may be used to enable communications between small cell 516 and macro cell 500. Small cell 516 may push information to macro cell 500 via the X2 interface at 515. Macro cell 500 may retrieve information from small cell 516 via the X2 interface at 515. The information may include a number of characteristics for a small cell.

Macro cell 500 may include base station 514, RRC 502, packet data convergence protocol (PDCP) 504, RLC 506, MAC 508, and/or physical layer (PHY) 512. Small cell 516 may include RRC 520, PDCP 522, RLC 524, MAC 526, and/or PHY 528. Small cell 516 may communicate with shared spectrum manager 530.

The small cells and the shared spectrum manager may interact so that the small cells may receive frequency allocations and may receive an operating mode to be used. For example, at 510, small cell 516 may retrieve a frequency allocation and/or an operating mode from shared spectrum manager 530. The operating mode may be compatible with other systems that may be operating in proximity and may include operations such as selecting the TDD configuration and low layer coexistence operations. This information may be relayed back to the macro cell using an X2 interface at 515. Additional characteristics of the small cell may be relayed to the macro cell at 515 from the small cell to the macro cell. The characteristics may include geo-location information of the small cell, such as a GPS location of the eNB; geo-location of a cell edge or a range of a cell controlled by the eNB; or the like. The characteristics may include information regarding a cell operating mode of the small cell, such as technology supported (e.g. TDD, FDD LTE, Wi-Fi), technology currently active or enable, Cell id, Cluster id (e.g. identification of the cluster grouping cells), center frequencies of a used frequency, bandwidth of a used frequency, mode of a used frequency (UL/DL, UL, DL, or the like), TDD configuration, RACH operating mode, a coexistence scheme of a silence period pattern of the cell, cell SIB information, small cell capability (e.g. as multi-layer operation, advanced mobility handling, concurrent multi-layer, and small cell operation), currently active or enable layer mode (e.g. multi or single), type of cells (e.g. outdoor, indoor, street), or the like.

Small cell discovery procedures may be provided. Whether a desired connectivity may be multi-layer (e.g. Macro/small cell) or single layer, a network may select which small cell (if any) may best serve the UE. A small cell may not be available. The cells may be in small or large clusters that may be deployed in a planned way or in a scattered way. A WTRU may not wish to monitor for small cells, which may involve scanning DSS bands and performing intra/inter frequency measurements.

Figure 6:
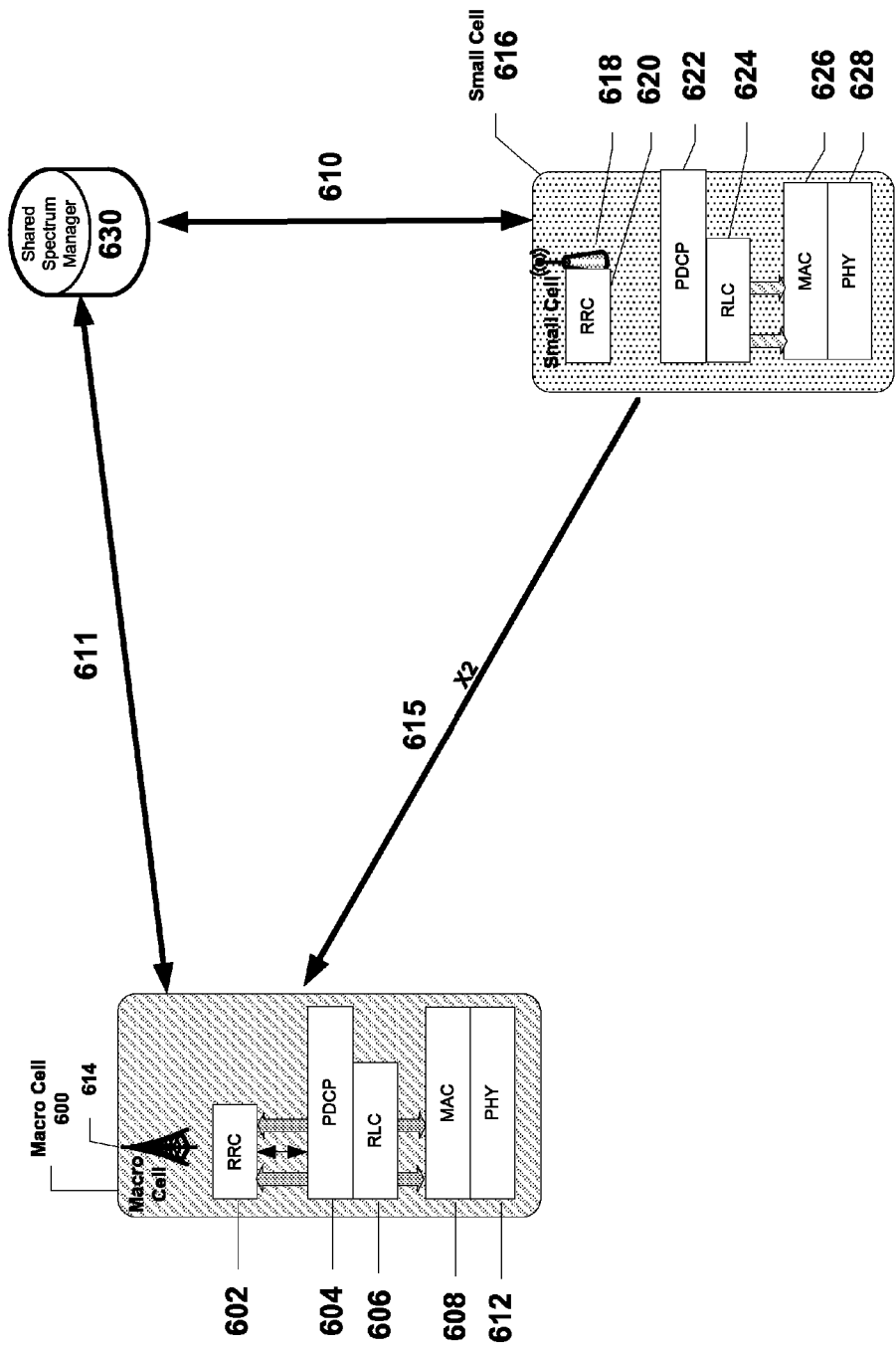
FIG. 6 illustrates an example architecture that may be used for discovery.

FIG. 6 illustrates an example architecture that may be used for discovery. As shown in FIG. 6, an X2 interface at 615 may be used to enable communications between small cell 616 and macro cell 600. Small cell 616 may push information to macro cell 600 via the X2 interface at 615. Macro cell 600 may retrieve information from small cell 616 via the X2 interface at 615. The information may include a number of characteristics for a small cell.

Macro cell 600 may include base station 614, RRC 602, PDCP 604, RLC 606, MAC 608, and/or PHY 612. Small cell 616 may include RRC 620, PDCP 622, RLC 624, MAC 626, and/or PHY 628. Small cell 616 and/or macro cell 600 may communicate with shared spectrum manager (SSM) 630.

As shown in FIG. 6, macro cell 600 may communicate with SSM and/or small cell 615. For example macro cell may communicate with SSM 630 via 611 and may communicate with small cell 616 via X2 interface 615. This may be done, for example, to allow macro cell 600 to retrieve information that may be used for discovery. For example, macro cell 600 may retrieve information from SSM 630 regarding one or more small cells, such as small cell 616. As another example, macro cell 600 may retrieve information from small cell 616. The information may include geo-location information of a small cell, such as a GPS location of the eNB; geo-location of a cell edge or a range of a cell controlled by the eNB; or the like. The information may include information regarding a cell operating mode of the small cell, such as technology supported (e.g. TDD, FDD LTE, Wi-Fi), technology currently active or enable, Cell id, Cluster id (e.g. identification of the cluster grouping cells), center frequencies of a used frequency, bandwidth of a used frequency, mode of a used frequency (UL/DL, UL, DL, or the like), TDD configuration, RACH operating mode, a coexistence scheme of a silence period pattern of the cell, cell SIB information, small cell capability (e.g. as multi-layer operation, advanced mobility handling, concurrent multi-layer, and small cell operation), currently active or enable layer mode (e.g. multi or single), type of cells (e.g. outdoor, indoor, street), or the like. As used herein, an O&M/CM entity may be used in interchangeably with an SSM entity. For example, an O&M/CM may be used in place of a SSM and a SSM may be used in place of an O&M/CM entity.

The small cell and the shared spectrum manager may interact so that the small cells may receive frequency allocations and may receive an operating mode to be used. For example, at 610, small cell 616 may retrieve a frequency allocation and/or an operating mode from shared spectrum manager 630. The operating mode may be compatible with other systems that may be operating in proximity and may include operations such as selecting the TDD configuration and low layer coexistence operations. This information may be relayed back to the macro cell using an X2 interface at 615. Additional characteristics of the small cell may be relayed to the macro cell at 615 from the small cell to the macro cell.

Figure 7:
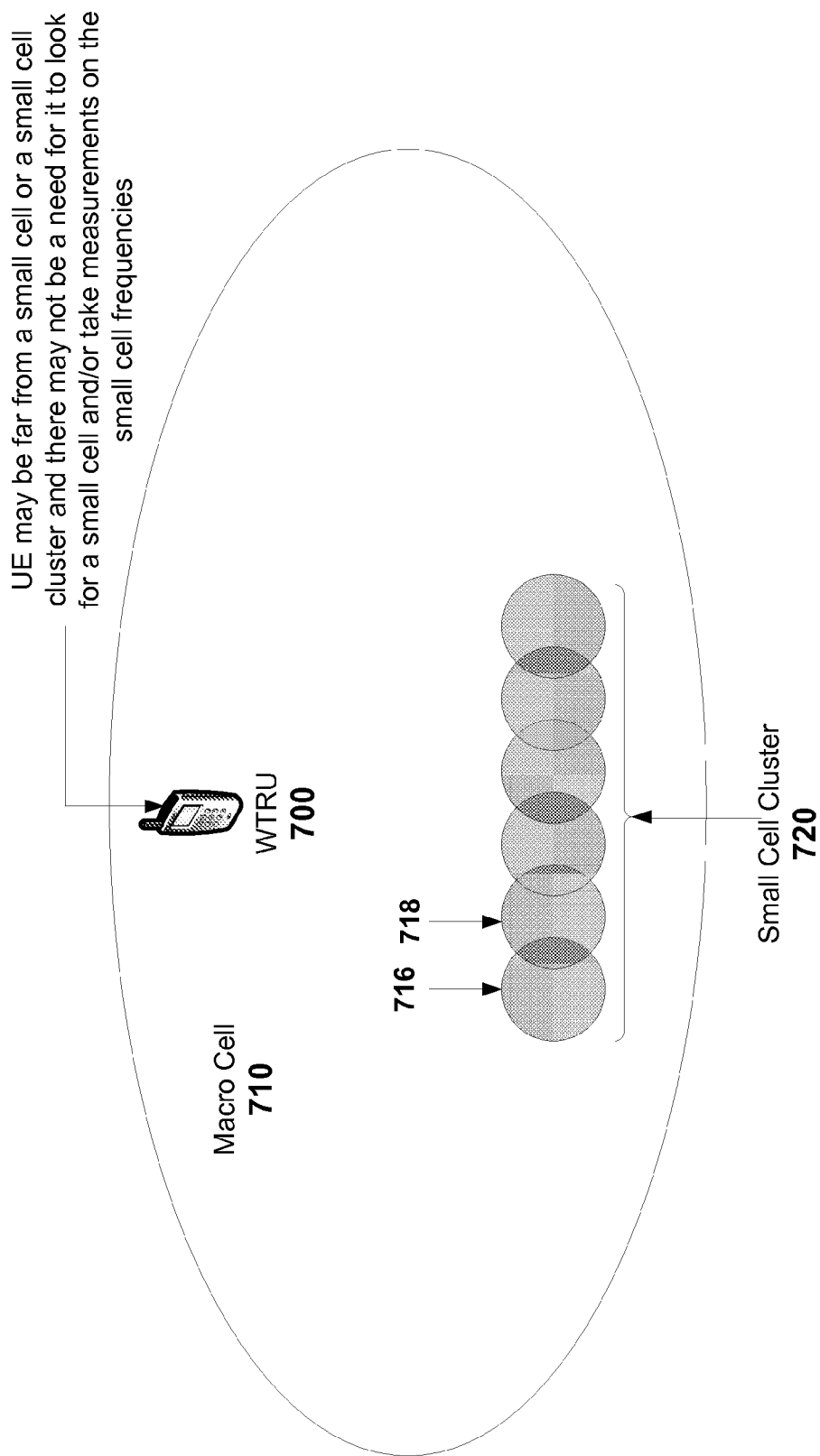
FIG. 7 illustrates small cell discovery procedures when a WTRU may not be in a vicinity of a small cell.

FIG. 7 illustrates small cell discovery procedures when a WTRU may not be in a vicinity of a small cell. As shown in FIG. 7, a WTRU, such as WTRU 700, may not be in the vicinity of a small cell, such as small cell 716, small cell 718, and/or small cell cluster 720, and may benefit from not searching for a small cell. For example, WTRU 700 may save battery by not searching for a small cell.

Discovery and selection of a small cell for multi-layer or single layer operation may be done with assistance from a macro cell, such as macro cell 710. Small cells, such as small cell 716 and/or small cell 718, may update their current operating mode to macro cell 710. This may be done, for example, as shown at 515 in FIG. 5. Referring again to FIG. 7, WTRU 700, which may initially be camped on macro cell 710, may be in a connected mode with macro cell 710. WTRU 700 may monitor small cell proximity signal as described herein. When WTRU 700 detects the small cell proximity signal, it may inform macro cell 710 of the proximity signal ID and/or the associated signal strength. WTRU 700 may periodically send its geo-location information to macro cell 710. Macro cell 710 may determine which small cell or cells may be suited for WTRU 700. Macro cell 710 may make its determination based on information sent by WTRU 700 and/or information received from a small cell via an X2 interface. Macro cell 710 may provide operating mode information to WTRU 700 on small cells that may be in close proximity to WTRU 700. Macro cell 710 may configure the WTRU 700 measurements on these small cells. Macro cell 710 may decide to offload data traffic to a small cell and may trigger a connectivity mode (e.g. Multi-layer or single layer) as described herein.

A method may be used to send a small cell proximity signal. This may be done, for example, by having small cells that may belong to a network send their proximity signal at a given frame. For example, 1 frame every 256 frames or every N frames. This may allow the small cell without an active WTRU to stay silent and save power. The macro cell may signal to the WTRU which frames or SFN may be used to look for a proximity signal. The proximity signal may be located using subcarriers, and may be made of a repetitive pattern of symbols spread out over n subcarriers that may use same symbol in time. The small cell may send a piece of a set of a recognizable pattern; this may be similar to primary synchronized signal (PSS). Placement in time within the frame in subframes (1 to 10) and symbols (1 to 14) may depend on the cell id.

A WTRU may receive and store a frame and may detect proximity signals that may be present in the frame. This may be done, for example, at an appropriate frame, which may be referred to as a discovery frame. The location in time within the frame may provide the number of possibilities, such as 140 possibilities, which may translate into a number of different identifications, such as 140 different identifications. The pattern of the proximity signal itself may provide a complementary identification. The WTRU may store the relative signal strength of a proximity signal and may relay the information to the eNB. This may help the eNB to triangulate the WTRU location.

If another PLMN or operator may use the shared spectrum, they may arrange to not use the same discovery frame to avoid confusion. For example, operator A may use SFN 256, 512, 768 and 0, for a discovery frame, while another operator may use a different offset, such as SFN 10, 266, 522, 778.

Assistance may be provided for connection procedures in a hierarchical network where macro cells may be operating in licensed spectrum and small cells may be operating in a dynamic and shared spectrum.

Hierarchical discovery through a small cell list and/or WTRU selection may be provided. UEs may be configured to camp (idle mode state) on the macro cell operating in licensed spectrum while the WTRU may establish a connection with one of the small cells in range. The WTRU may establish a connection with one of the small cells when the WTRU may be paged or when an event may trigger the WTRU to request a connection, such as a mobile originated session. This may be done, for example, to allow an operator to offload connected mode traffic to underlay small cells operating in dynamic and shared spectrum.

Figure 8:
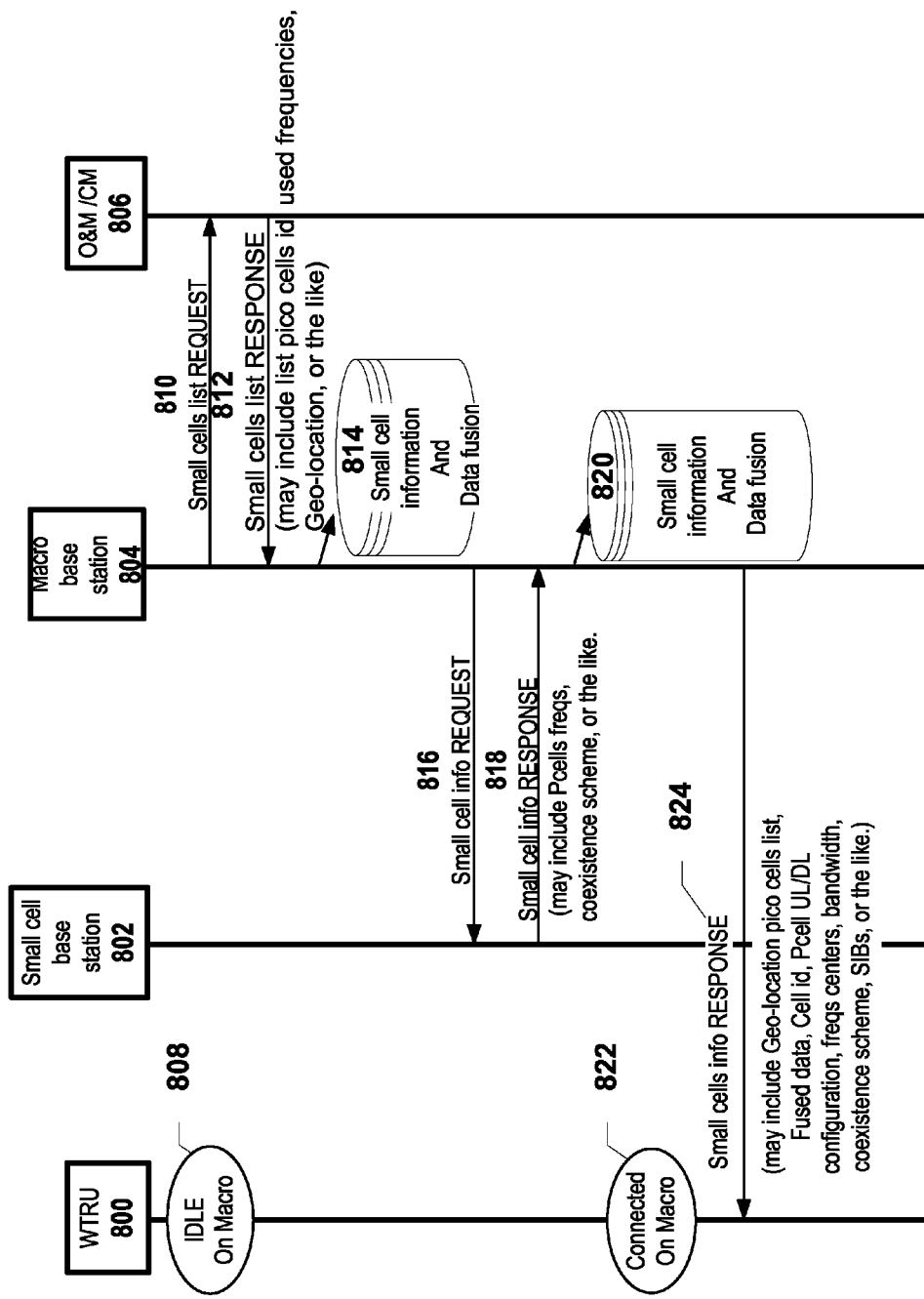
FIG. 8 illustrates assistance for connection procedures in a hierarchical cell structure.

FIG. 8 illustrates assistance for connection procedures in a hierarchical cell structure. This may be done, for example, to minimize issues, such as discovery issues, that may occur when the spectrum that a small cell may be operating in may be composed of a number of channels that may be occupied by other technologies. A macro cell may be able to simplify discovery.

A list of small cell base stations for a geo-location area may be acquired by a macro base station. The macro base station may, opportunistically and/or periodically, coordinate with a coexistence manager (CM) and/or an operation and maintenance (O&M) entity and may request a list of the accessible small cells base stations in the macro base station coverage area. The list may be transmitted to the macro base station. The list of small cells base stations may include related information, such as cell-id, used frequency, Geo-location, connectivity information, an IP address of the small cell base station, or the like.

Small cell operation information details may be acquired. The macro base station may use the list of the small cells and may communicate with the small cells base stations to request detailed information. The detailed information may include a geo-location, a GPS location, a geo-location of a cell edge or a range of a cell, a primary cell configuration information, or the like. The primary cell configuration information may include technology supported, TDD support information, FDD support information, cell id, center frequencies of a used frequency, bandwidth of a used frequency, mode of a used frequency (UL/DL, UL, DL), RACH preamble, coexistence scheme of silence period pattern of the cell, cell SIB information, or the like. The primary cell configuration information may include multi-layer capability or concurrent single layer/multi-layer capability; single layer capability, which may include mobility handling, or the like.

On the reception of a request from a macro cell base station, the small cell base station may respond fully or partially with the requested information. The macro cell may fuse data received from different small cells to produce fused data, such as a map of small cells. The macro cell may configure a small cell to operate in a specific cell configuration (frequency, power, etc.).

A WTRU may be informed of its surrounding small cells and may be provided with information regarding its surrounding small cells. A WTRU may get this information from a macro cell. For example, a macro cell may broadcast a set of information for small cells using its system information. SIB information may provide a list of small cells within the macro cell range, and may provide information such as the operating frequency for a small cell and cell ID. Information about regarding a geo-location of a small cell may also be provided. A WTRU aware of its geo-location may select small cells that may correspond to the geo-location provided from the macro cell.

A WTRU may also be informed of its surrounding small cells from a macro cell. For example, a macro cell may inform the WTRU about small cells through an RRC message. This may occur, for example, when the WTRU communicates to the macro cell, such as when the WTRU may establish a connection request to register, may perform a tracking area update, or may transmit a RRC message. The WTRU may have some geo-location awareness and may be able to provide this information to the macro cell. The macro cell may tailor the small cell information given to the WTRU based on this location. When a WTRU may be configured to use a small cell for a connected mode cell and may reselect a macro cell, it may initiate a RRC procedure to acquire small cell information from the reselected macro cell. The WTRU may read this information on its own, such as during a cell search/selection. The WTRU may read this information based on information provided in the paging message triggering the connection request.

As shown in FIG. 8, at 808, WTRU 800 may be idle on a macro cell, which may include macro base station 804. At 810, macro base station 804 may send a small cell list request to O&M/CM 806. At 812, O&M/CM 806 may send a small cell list response to macro base station 804. At 814, macro base station 804 may store the small cell information and may perform data fusion. At 816, macro base station 804 may send a small cell information request to small cell base station 802. At 818, small cell base station 802 may send a small cell information response to macro base station 804. The small cell information response may include primary cell (Pcell) frequencies, coexistence schemes, or the like. At 820, macro base station 804 may store the small cell information that may be received from small cell base station 802 and may perform data fusion. At 822, WTRU 800 may be connected on the macro cell, which may be served by macro base station 804. At 824, macro base station 804 may transmit a small cell information response to WTRU 800. The small cell information response may include geo-location information, small cell lists, fused data, frequency centers, bandwidth, coexistences schemes, SIBs, or the like.

Procedures for paging a WTRU may be enhanced using methods disclosed herein. For example, while in IDLE mode on macro cell, the WTRU may rank small cells even though it may not reselect the small cells. When paged, the macro cell may inform the WTRU to start a connection on a small cell. The WTRU may use its ranked list to select the cell, and may synchronize to it. The WTRU may know some system information of the small cell through one of the mechanisms described herein. The WTRU may initiate a RACH procedure on a small cell and may send a RRC Connection request on that cell.

In an example, while in IDLE mode on macro cell, the WTRU may also rank small cells even though it may not reselect the small cells. A WTRU may respond to the page with an RRC connection request and an indication to start connected mode on a small cell that may be ranked. Since the WTRU may be sending the connection request on the macro cell, the WTRU may not know the system information of the small cell. As part of the RRC connection procedure, the macro cell may respond to the connection request with the information about the small cell. The WTRU may start a RACH procedure on the small cell, which may be a contention-free RACH procedure.

In an example, the network may know that the WTRU may prefer a connected mode through small cells. A page request from the macro cell may indicate to the WTRU to start a connection in a small cell. The network may give the WTRU time to perform a cell search to find small cells. For example, the WTRU may have time to synchronize to the cell and read the system information. The WTRU may issue the RACH in the small cell. The WTRU may also respond to the macro cell telling the macro that it may have received the page and that it has begun its search for the small cell.

Selection of multi-layer/single layer operation (macro base station) may be provided. Small cells may operate in single layer operation or multi-layer operation. Multi-layer operation may be a mode where a WTRU may be connected to two sites; a first site on a macro cell layer and a second site on a small cell layer. The WTRU may be expected to use the macro cell for RRC and NAS control signaling while relying on the small cell for data transfer. The macro cell eNB may be the anchor point for the multi-layer operation. The macro cell may be responsible for routing traffic between the macro cell layer and the small cell layer. Routing may be done on a per radio bearer (RB) basis; some radio bearers may remain on the macro cell and some radio bearers may be transferred to the small cell over the X2. In a single-layer operation, when the WTRU may be handed-over to the small cell, the small cell base station may be responsible for the connected mode operation, which may include mobility from small cell to small cell.

The macro base station may determine whether a WTRU that may be served may stay in single layer with the macro base station, may move to a small cell in close proximity in single layer operation, or may move in a multi-layer operation. A number of metrics may be used to make this determination, For example, a macro base station may consider WTRU capability to support multi-layer or single layer operation, the capability of a small cell in close proximity (i.e. target cell) to support single layer operation or multi-layer operation (or both concurrently), the mode of operation of a small cell, macro and target small cell load and congestion level, WTRU behavior (e.g. mobility below a certain speed threshold), requested services that may require a high data rate, or the like.

Multi-layer/single layer small cell operation may be provided. A small cell may have some UEs that may be in multi-layer operation mode and other UEs that may be in a single layer operation mode. To support multi-layer/single layer operation, the small cell may have routing functionality at the RLC layer. This may allow the small cell to keep track of which radio bearers that may be tied to a macro cell (e.g. those that may be in multi-layer), and which radio bearers may be tied to an S-GW. The small cell may use the functionality at the RLC layer to route traffic for multi-layer operation and single layer operation.

Figure 9:
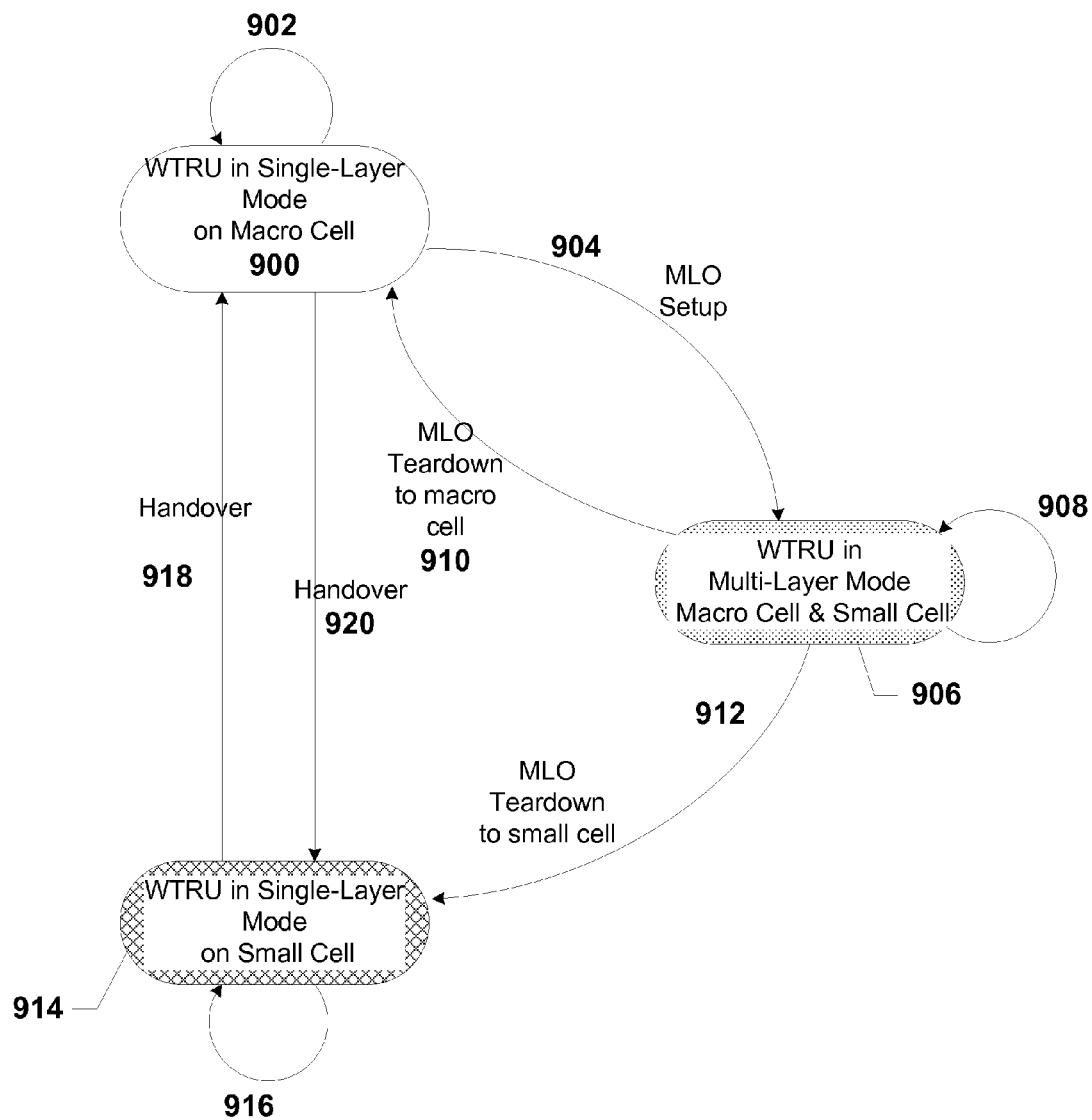
FIG. 9 illustrates connected mode system states.

A WTRU state diagram of multi-layer/single operation may be provided. For example, FIG. 9 illustrates connected mode system states. A WTRU may camp on a macro cell (for example idle mode operation). The WTRU may be initially connected to the macro cell in single layer mode. The macro base station may decide to move the WTRU in single layer mode or multi-layer mode. As shown in FIG. 9, a transition from the single layer mode on macro cell to single layer mode in small cell may be done through a handover procedure that may be initiated by the macro cell. Where an eNB may decide to move the WTRU to the multi-layer mode, this may be triggered with a multi-layer operation setup that may be initiated by a macro cell.

As shown in FIG. 9, a WTRU may be in a single-layer mode on a macro cell at 900. At 902, the WTRU may remain in single-layer mode on the macro cell 900. At 920, a handover may occur such that the WTRU may transition from single-layer mode on a macro cell at 900 to a single-layer mode on a small cell 916. At 904, multi-layer operation (MLO) setup may occur and the WTRU may be transitioned from a single-layer mode on a macro cell 900 to a multi-layer mode 906 that may use a macro cell and a small cell.

At 908, the WTRU may remain in a multi-layer mode that may use a macro cell and a small cell. At 910, MLO tear down may occur and the WTRU may be transitioned from multi-layer mode 906 to single-layer mode on a macro cell 900. At 912, MLO tear down may occur and the WTRU may be transitioned from multi-layer mode 906 to operate in single-layer mode on a small cell 914.

At 916, the WTRU may remain in single-layer mode on a small cell 914. At 918, a handover may occur such that the WTRU may transition from single-layer mode on a small cell 914 to single-layer mode on a macro cell 900.

Assistance for connection procedures in small cell deployments may be provided. In a small cell deployment without a macro cell, a terminal, such as a WTRU, may acquire neighbor cell information. As used herein, an O&M/CM entity may be replaced by a SSM.

Figure 10:
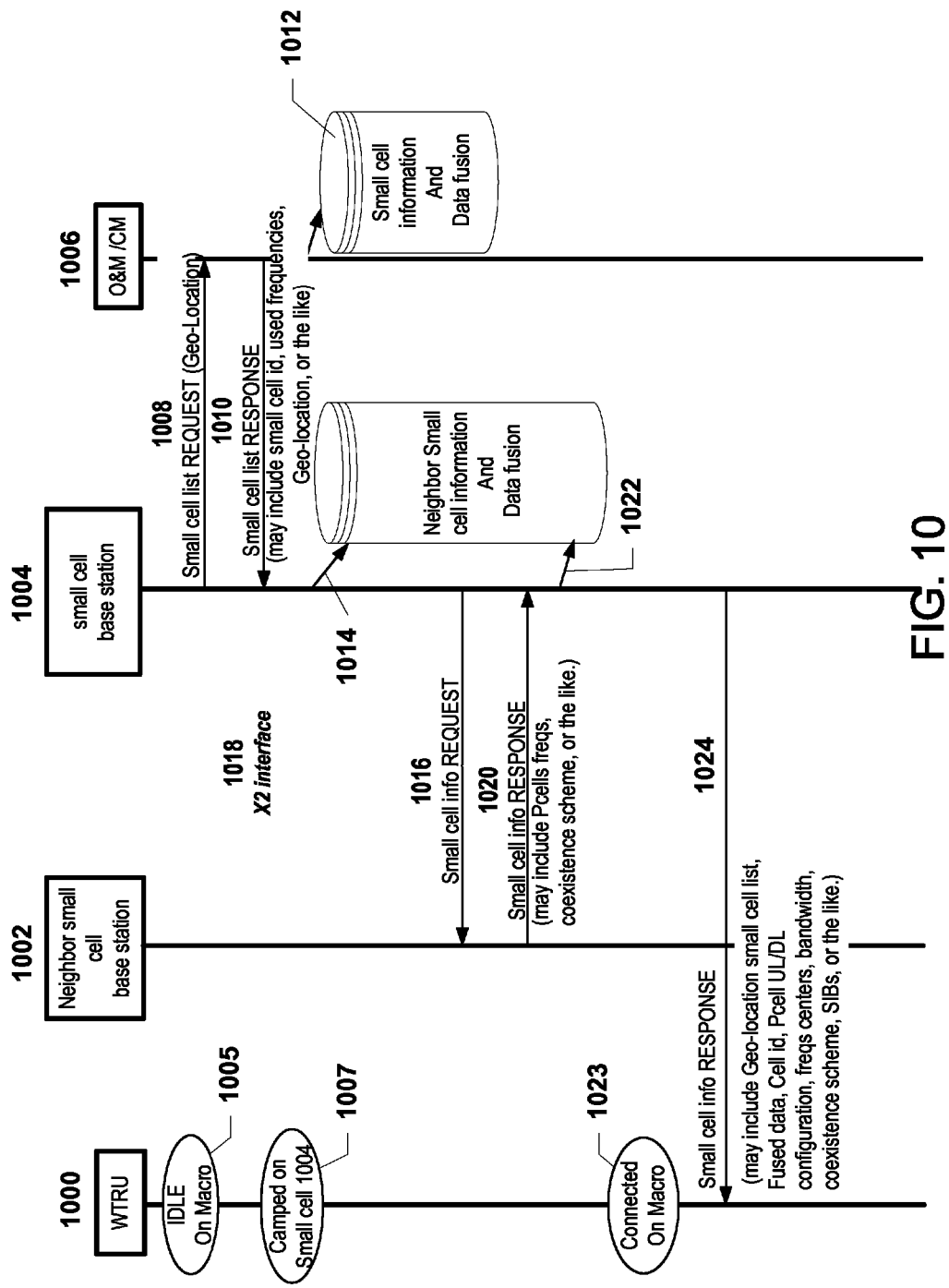
FIG. 10 illustrates assistance for connection procedures in small cell deployments.

FIG. 10 illustrates assistance for connection procedures in small cell deployments. For example, FIG. 10 illustrates how a WTRU may acquire information regarding a neighbor small cell in a small cell deployment that may not have a macro cell. This may be done, for example, by having a serving cell request neighbor cells to get operation information on a periodic or on a request basis.

As shown in FIG. 10, a list of small cell base stations may be acquired for a geo-location area. A small cell base station that a WTRU may be camped on may, opportunistically and/or periodically, coordinate with the CM and O&M and may request a list of small cell base stations in the neighborhood of a small cell coverage area or in a geo-location area, such as the WTRU geo-location area. The small cell base station may get the information regarding the neighboring small cells through discovery, which may occur by listening to a neighboring broadcast or through signaling using, for example, an X2 interface. The list of neighbor small cell base stations may be transmitted to the small cell station where the WTRU may be camped. The list may include information related to the cell-id, the frequency used, the geo-location, the connectivity information, the IP of the small cell base station, or the like.

Small cell operation information may be acquired. The WTRU may be camped at a small cell base station. The camped small cell base station may use a list of neighboring small cells, for example, to communicate with the small cell base stations to request operation information. The operation information may include a geo-location, GPS information, primary cell configuration, technology TDD and/or FDD, cell id, center frequencies of a used frequency, bandwidth of a used frequency, mode of a used frequency (UL/DL, UL, DL), RACH preamble, coexistence scheme of silence period pattern of the cell, cell SIB information, or the like. A small cell base station receiving the previous request from the camped small cell base station, may respond fully or partially with the requested information. The camped small cell base station may fuse the received information from different small cells to produce fused data, such as a map of small cells.

A WTRU may be informed of its surrounding small cells and information regarding its surrounding small cells. The WTRU may be camped at a small cell. The camped small cell may broadcast information regarding neighboring small cells. The camped small cell may page a WTRU in idle mode and may inform the WTRU with information regarding the small cells. For example, the camped cell may inform the WTRU of small cells that may be within an area surrounding the WTRU. The camped small cell may communicate through RRC signaling with a WTRU in connected mode and may inform the WTRU of small cells that may be within an area surrounding the WTRU.

A WTRU in connected mode may request a list of small cells and/or information regarding cells within an area surrounding the WTRU. A WTRU, such as a WTRU, may request a list of the small cells base stations in the neighborhood of the WTRU coverage area from a third party, such as a network sensing database service provider through IP connectivity.

Acquisition of small cell operating information may be provided. A small cell may inform its neighboring small cells when there is a change to its operating information. A small cell may push its updated operating information to its neighboring small cells. This may be done, for example, to provide neighboring small cells with updated operating information.

As shown in FIG. 10, at 1005, WTRU 1000 may idle on a macro cell. At 1007, WTRU 1000 may be camped on small cell base station 1004. At 1008, small cell base station 1004 may send a small cell list request to O&M/CM 1006, which may include geo-location information for small cell 1004. At 1010, O&M/CM 1006 may send a small cell list response to small cell 1004. The small cell list response may include a small cell id, frequencies that may be used, a geo-location, or the like. At 1012, O&M/CM 1006 may store small cell information, such as information from small cell base station 1004 and/or neighbor small cell base station 1002. At 1014, WTRU 1004 may store neighbor small cell information receive from the small cell list response send by O&M/CM 1006 and may perform data fusion. At 1016, small cell base station 1004 may send a small cell information request to neighbor small cell base station 1002 via, for example, X2 interface 1018. At 1020, neighbor small cell base station 1002 may send a small cell information response to small cell base station 1004 via, for example, X2 interface 1018. The small cell information response may include a Pcell frequency, a coexistence scheme, or the like. At 1022, small cell base station 1004 may store information from the small cell information response and may perform data fusion. At 1023, WTRU 1000 may be connected to the macro cell. At 1024, small cell base station 1004 may transmit a small cell information response that may include geo-location information, a small cell list, fused data, a cell ID, a Pcell UL/DL configuration, a frequency center, a band width, a coexistence scheme, a SIB, a combination thereof, or the like.

Figure 11:
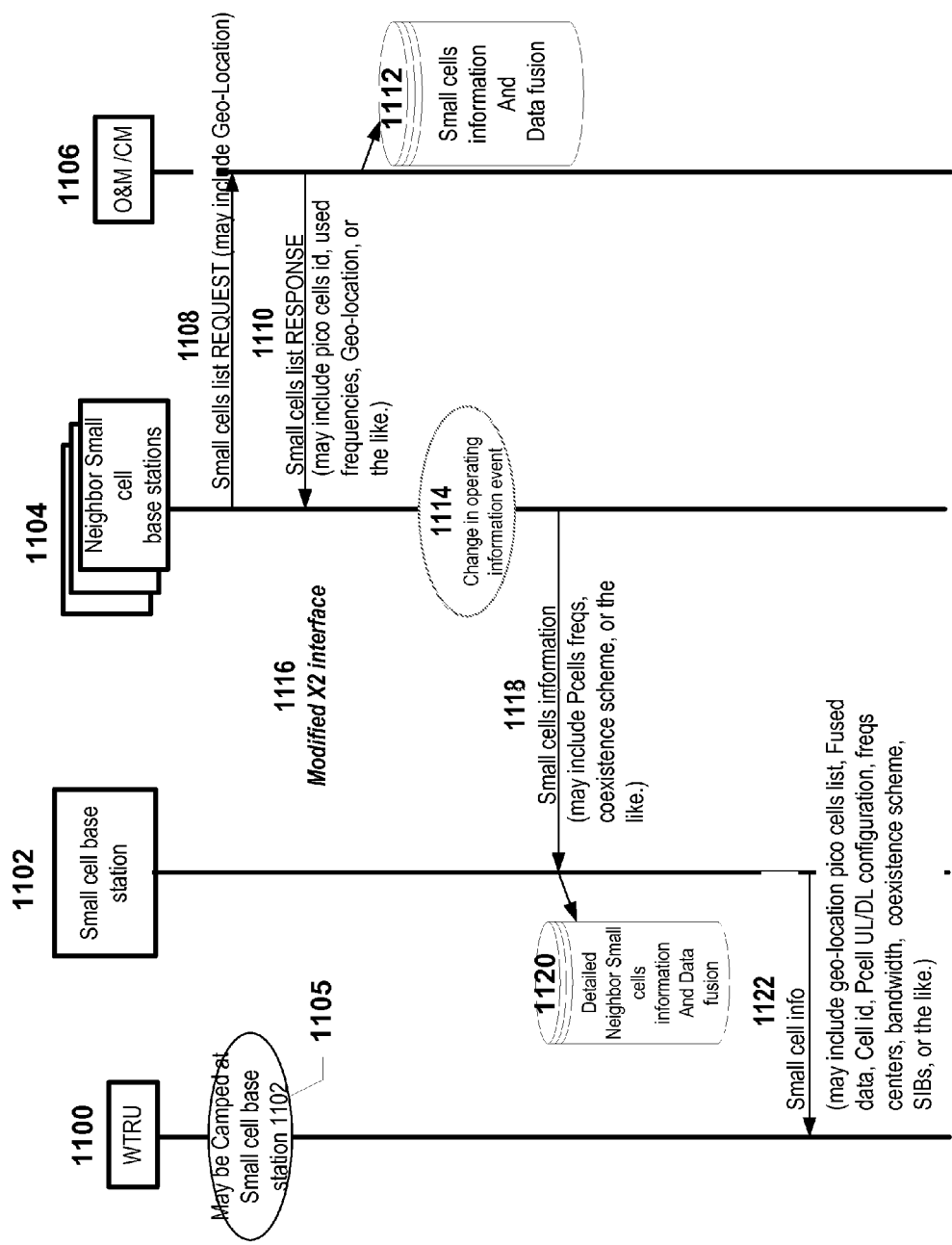
FIG. 11 illustrates a method to enable acquisition of small cell operation information.

FIG. 11 illustrates a method to enable acquisition of small cell operation information. A small cell base station list may be acquired for a geo-location area. A small cell base station may, opportunistically and/or periodically, coordinate with the CM and O&M and may request a list of the accessible neighboring small cells base stations in a coverage area or in a geo-location area. The geo-location area may be the WTRU geo-location area. The small cell base station may get the neighboring small cell information through discovery by either listening to the neighboring broadcast or through signaling through a X2 interface.

Small cell operation information may be acquired. When operating information of the small cell may be updated, a small cell base station may communicate the updated operating information update to neighboring cells. The small cell base station may communicate its updated operating information to its neighboring base stations periodically.

A WTRU, such as a WTRU, may be informed of its surrounding small cells and information regarding the surrounding small cells. This may occur in a number of ways. For example, a small cell may broadcast the neighboring small cells information to a WTRU periodically. As another example, a small cell may page a WTRU in idle mode and may provide the WTRU with small cell information regarding small cells in the area surrounding the WTRU. As another example, a small cell may communicate through RRC signaling with a WTRU in connected mode and may provide the WTRU with small cell information regarding small cells in the area surrounding the WTRU. As another example, a WTRU in connected mode may request a list of small cells in an area from its camped small cell. As another example, a WTRU may request a list of accessible small cell base stations a coverage area from a third party, such as a network sensing database service provider.

As shown in FIG. 11, at 1105 WTRU 1100 may be camped at small cell base station 1102. Neighbor small cells eNB 1104 may be one or more eNBs for small cells that may be in the vicinity of WTRU 1100. At 1108, neighbor small cells eNB 1104 may send a small list request that may include geo-location information to O&M/CM 1106. At 1110, O&M/CM 1106 may send a small cell list response to neighbor small cells eNB 1104. The small cell list response may include a small cell identification, a frequency that may be used, a geo-location, a combination thereof, or the like. At 1112, O&M/CM 1106 may store small cell information and may perform data fusion. At 1114, one or more eNBs in neighbor small cells eNB 1104 may detect a change in an operating information event. At 1118, neighbor small cells eNB 1104 may send small cell information to small cell base station 1102 via, for example, X2 interface 1116. The small cell information may include, for example, a pcell frequency, a coexistence scheme, a combination thereof, or the like. At 1120, small cell base station 1102 may store neighbor small cell information, such as the small cell information received at 1118, and may perform data fusion. At 1122, small cell base station 1102 may send small cell information to WTRU 1100. The small cell information may include, for example, a geo-location, a small cell list, fused data, a cell identification, a pcell UL/DL configuration, a frequency center, a bandwidth, a coexistence scheme, a SIB, a combination thereof, or the like.

Figure 12:
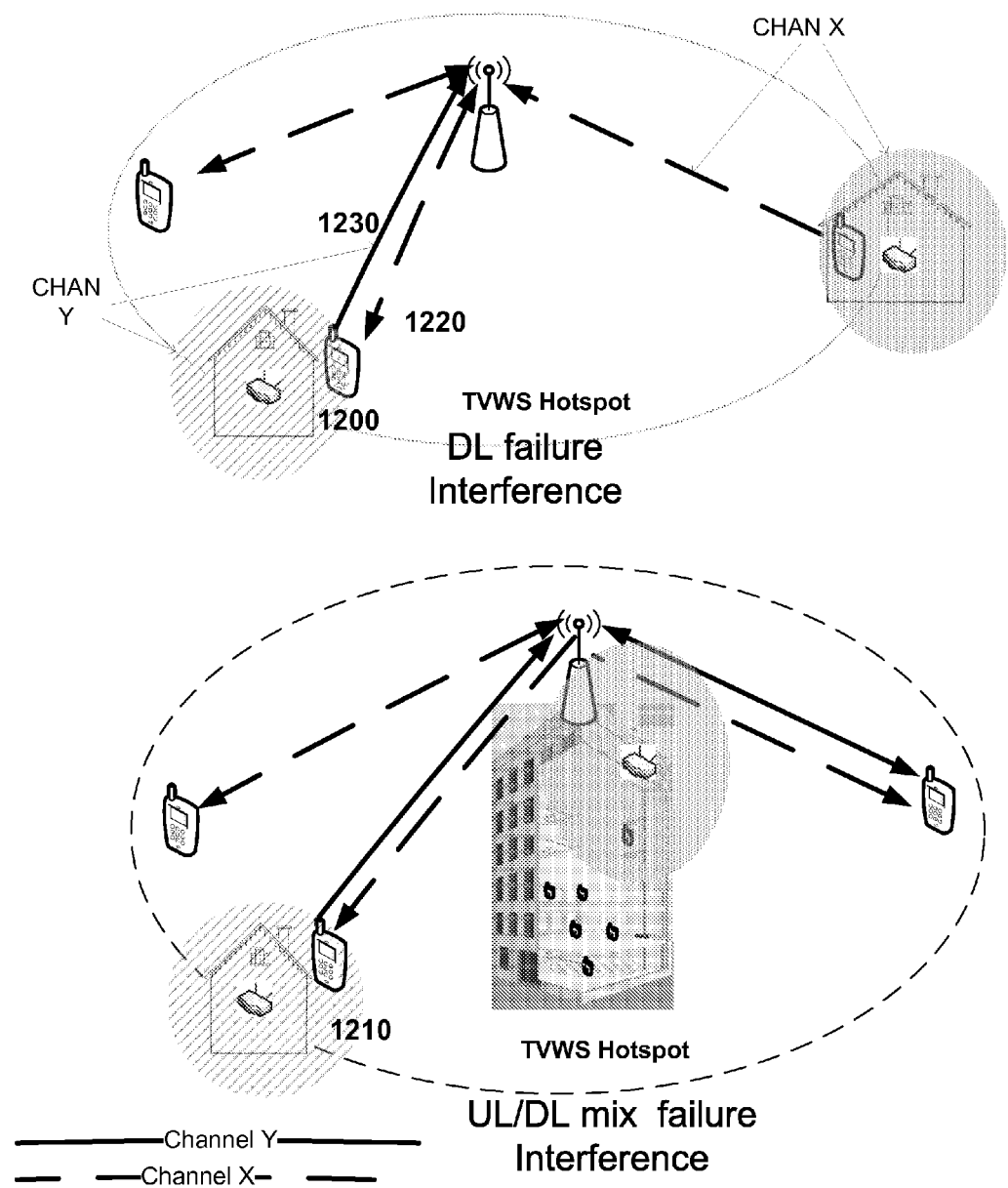
FIG. 12 illustrates a method for localized interference mitigation.

FIG. 12 illustrates a method for localized interference mitigation. A LTE network may be deployed using small cells operating in a dynamic and shared spectrum. There may be an overlay of macro cells using a licensed spectrum. Operation in the presence of localized interference may be handled through configuring cells for UEs to operate in UL, DL, or in both directions. The presence of localized interference may also be handled by using multiple active channels. The localized interference may be caused, for example, by a Wi-Fi network operating in a subset of the small cell.

To handle the localized interference, a localized interference event may be detected. The localized interference event may be an event that may indicate that the operation of a cell for a WTRU or for a base station may be compromised. For example, the interference event may indicate that interference may be caused by a localized Wi-Fi network or other types of network in one direction (uplink or downlink) when the Wi-Fi network, the WTRU, and the base station may be operating on the same band.

As shown in FIG. 12, if a Wi-Fi network may be operating in close proximity to a WTRU, but may not be in close proximity to a base station, the WTRU transmission may allow the WTRU to transmit to the base station. Because the WTRU transmission may be to the Wi-Fi network, the Wi-Fi network may stop transmitting and may back-off. Uplink transmission may function, but downlink transmission may not. When the base station transmits to the WTRU, it is farther to the WTRU than the Wi-Fi network; the Wi-Fi network signal may dominate the channel from the WTRU perspective. The base station transmission level received by the Wi-Fi network may not be strong enough to force the Wi-Fi to stop transmission and to back-off.

Once the base station or the WTRU detects a localized interference event, it may be reported to the radio resource management (RRM) entity in the base station and the cell may be reconfigured to operate in a direction for a UE. The same channel usage for another WTRU may be different.

The base station may take into account the aggregation capability of a given WTRU and may indicate to the WTRU that a cell may operate in uplink or in downlink. For example, the WTRU shown in FIG. 12 at 1200 and at 1210 may be operating close to the Wi-Fi. The WTRU may receive downlink control information and traffic through channel X at 1220 and may send data and control information associated with both channels (X and Y) in the Y channel at 1230.

A base station may reconfigure where control information may be sent in the context of a WTRU aggregating over multiple channels. For example, a base station using channel X may be close to a Wi-Fi network, but may still use the channel for downlink operation UE. Channel Y may be used by Wi-Fi network in close proximity; the uplink operation may work. For a WTRU, the control channel, which may include scheduling, PHICH ACK/NACK, SIB information, or the like, may be sent over channel X in the downlink, but the control channel for uplink (PUCCH, RACH) may be sent over channel Y.

Figure 13A:
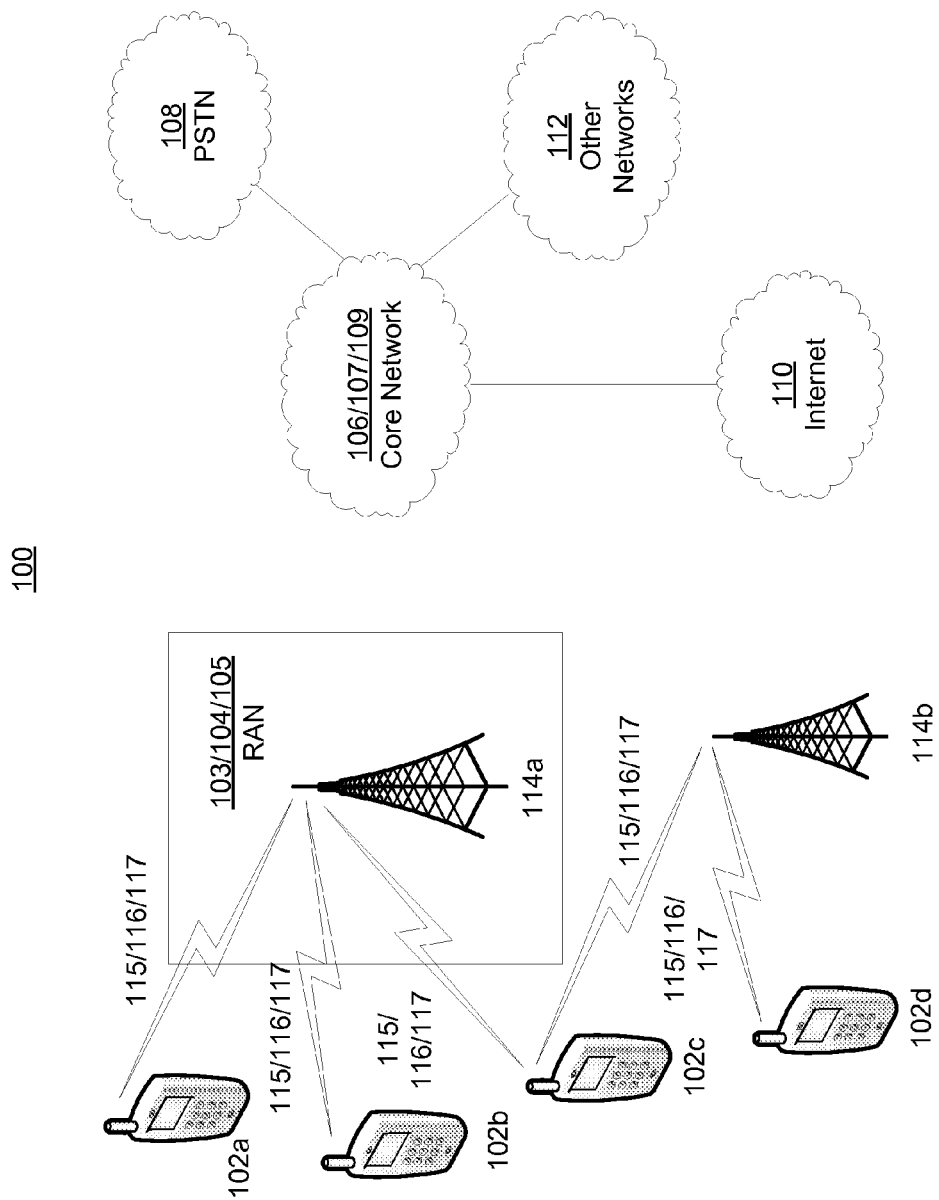
FIG. 13A is a system diagram of an example communications system in which one or more disclosed embodiments may be implemented.

FIG. 13A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 13A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 13A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 13A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 13A may be configured to communicate with the base station 114a, which may employ a cellular-based radio technology, and with the base station 114b, which may employ an IEEE 802 radio technology.

Figure 13B:
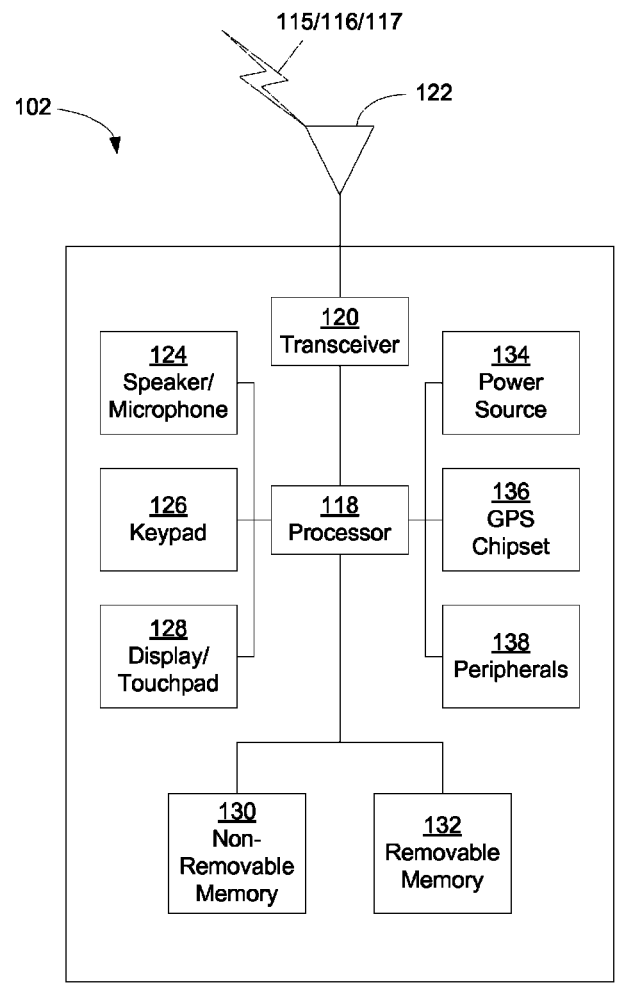
FIG. 13B is a system diagram of an example wireless transmit/receive unit (WTRU) that may be used within the communications system illustrated in FIG. 13A.

FIG. 13B is a system diagram of an example WTRU 102. As shown in FIG. 13B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 13C:
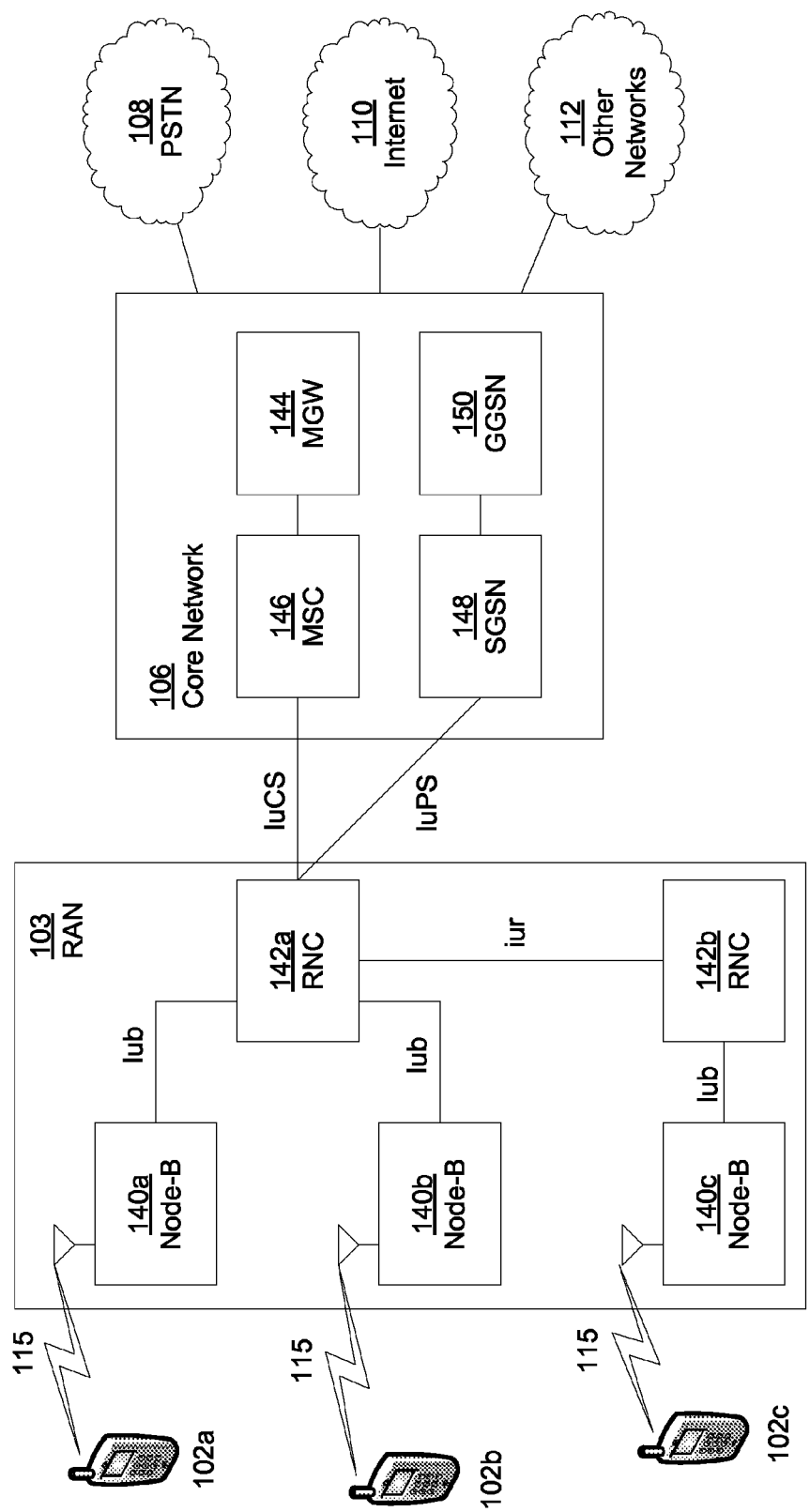
FIG. 13C is a system diagram of an example radio access network and an example core network that may be used within the communications system illustrated in FIG. 13A.

FIG. 13C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 13C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 13C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 13C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13D:
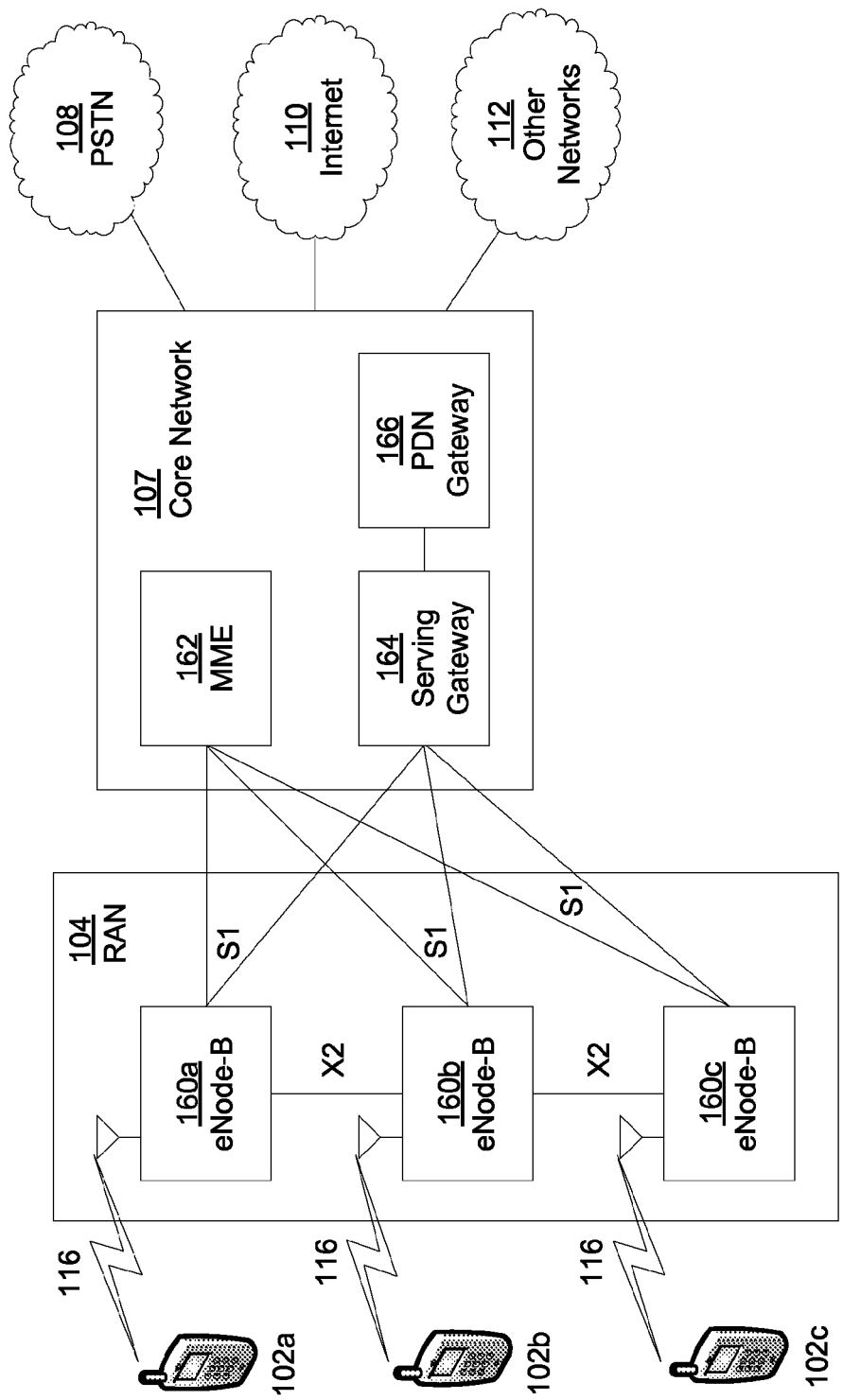
FIG. 13D is a system diagram of an example radio access network and an example core network that may be used within the communications system illustrated in FIG. 13A.

FIG. 13D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 13D, the eNode-Bs 160a, 160b, 160c may communicate with one another over an X2 interface.

The core network 107 shown in FIG. 13D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 13E:
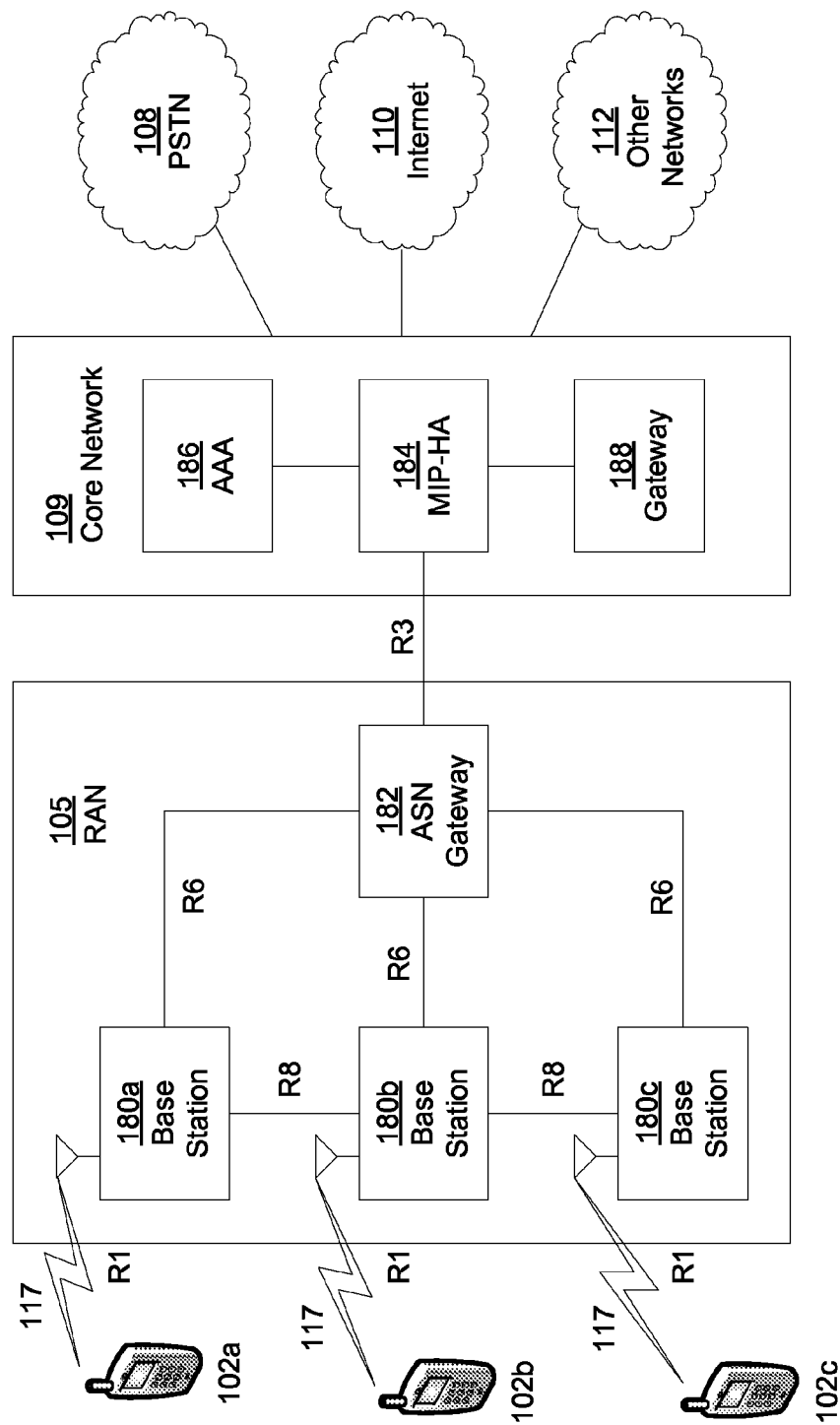
FIG. 13E is a system diagram of an example radio access network and an example core network that may be used within the communications system illustrated in FIG. 13A.

FIG. 13E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 13E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 13E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 13E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A base station comprising: a processor, the processor being configured to: determine a layer capability of a small cell; determine a layer connectivity mode for the small cell operating in a dynamic and shared spectrum; generate a small cell information response that comprises the layer connectivity mode for the small cell and the layer capability of the small cell; and send the small cell information response to a macro base station to enable the macro base station to determine a layer connectivity mode for a wireless transmit/receive unit (WTRU).

2. The base station of claim 1, wherein the processor is further configured to receive a small cell information request from the macro base station.

3. The base station of claim 1, wherein the processor is configured to send the small cell information response to the macro base station via an X2 interface.

4. The base station of claim 1, wherein the processor is further configured to determine an identification of a cluster of cells that includes the small cell, and wherein the small cell information response further comprises the identification of the cluster of cells.

5. The base station of claim 1, wherein the processor is further configured to determine a load level for the small cell that indicates an amount of data traffic at the small cell, and wherein the small cell information response further comprises the load level for the small cell.

6. The base station of claim 1, wherein the processor is further configured to determine a location for the small cell, and wherein the small cell information response further comprises the location for the small cell.

7. The base station of claim 1, wherein the processor is further configured to determine a location of an edge of the small cell, and wherein the small cell information response further comprises the location of the edge of the small cell.

8. The base station of claim 1, wherein the processor is further configured to determine a frequency allocation for the small cell, and wherein the small cell information response further comprises the frequency allocation for the small cell.

9. The base station of claim 8, wherein the processor is further configured to determine a coexistence mode indicating an operating mode that is compatible with another base station.

10. The base station of claim 9, wherein the processor is configured to determine the frequency allocation for the small cell and the coexistence mode by receiving the frequency allocation and the coexistence mode from a shared spectrum manager.

11. The base station of claim 1, wherein the processor is further configured to:
determine a neighbor small cell; and
retrieve neighbor small cell information from the neighbor small cell.

12. The base station of claim 11, wherein the processor is further configured to send the neighbor small cell information to the WTRU.

13. The base station of claim 1, wherein the processor is further configured to receive neighbor small cell information from a neighbor small cell.

14. The base station of claim 13, wherein the processor is further configured to send the neighbor small cell information to the WTRU.

15. A base station comprising: a processor, the processor being configured to: receive a small cell information response from a small cell operating in a dynamic and shared spectrum; determine a layer capability of the small cell using the small cell information response; and determine a layer connectivity mode for a wireless transmit/receive unit (WTRU) using the layer capability of the small cell information response.

16. The base station of claim 15, wherein the layer connectivity mode for the WTRU is one of a single layer with a macro cell mode, a single layer with the small cell mode, or a multi-layer mode.

17. The base station of claim 15, wherein the processor is further configured to send the layer connectivity mode to the WTRU to instruct the WTRU to operate in a single layer mode with a macro base station.

18. The base station of claim 15, wherein the processor is further configured to send the layer connectivity mode to the WTRU to instruct the WTRU to operate in a single layer mode with a small base station.

19. The base station of claim 15, where the processor is further configured to send the layer connectivity mode to the WTRU to instruct WTRU to operate in a multi-layer mode.

20. The base station of claim 15, wherein the processor is further configured to send the layer connectivity mode to the WTRU to instruct the WTRU to connect to a macro cell and to connect to the small cell.

21. The base station of claim 15, wherein the processor is further configured to send a small information request to a small base station.

* * * * *